US007683968B2

(12) United States Patent  (10) Patent No.: US 7,683,968 B2
Hagihara et al.  (45) Date of Patent: Mar. 23, 2010

(54) IMAGE-TAKING APPARATUS

(75) Inventors: Tatsuhiko Hagihara, Asaka (JP); Naoyuki Nishikawa, Minami-Ashigara (JP); Akihiro Maejima, Asaka (JP); Nobuyoshi Maezono, Asaka (JP); Tetsuya Okumura, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 464 days.

(21) Appl. No.: 11/654,642

(22) Filed: Jan. 18, 2007

(65) Prior Publication Data

US 2007/0188649 A1    Aug. 16, 2007

(30) Foreign Application Priority Data

Jan. 19, 2006   (JP) .............................. 2006-011384

(51) Int. Cl.
*G02B 13/16*  (2006.01)
*H04N 5/225*  (2006.01)
(52) U.S. Cl. ....................................... 348/373; 348/335
(58) Field of Classification Search ................. 348/335, 348/373–375; 15/101.001–245.1
See application file for complete search history.

(56) References Cited

U.S. PATENT DOCUMENTS 7,355,649 B2 * 4/2008 Takai .......................... 348/372

7,365,788 B2 * 4/2008 Ito .............................. 348/335
7,446,813 B2 * 11/2008 Nakamoto et al. ........... 348/374
2005/0129394 A1 * 6/2005 Ichikawa ..................... 396/429

FOREIGN PATENT DOCUMENTS

JP        07-064152 A       3/1995

* cited by examiner

*Primary Examiner*—Jason Chan
*Assistant Examiner*—Pritham Prabhakher
(74) *Attorney, Agent, or Firm*—Sughrue Mion, PLLC

(57) ABSTRACT

An image-taking apparatus which captures object light to take an image includes: an optical device through which the object light is transmitted; an image pickup device which generates an image signal representing an object image; and a cleaning section which is deformed by receiving a predetermined stimulus, the cleaning section being brought into contact with, and being separated from, the optical device and/or the image pickup device to clean substances attached to the contact portion. The apparatus further includes: a stimulus application section which applies the stimulus to the cleaning section; and a control section which controls the deformation of the cleaning section by controlling the stimulus applied from the stimulus application section, and which thus causes the cleaning section to clean the contact portion.

9 Claims, 17 Drawing Sheets

IMAGE-TAKING APPARATUS

FIELD OF THE INVENTION

The present invention relates to an image-taking apparatus which takes an image of object light.

BACKGROUND OF THE RELATED ART

In recent years, digital cameras, digital video cameras, and the like have been miniaturized rapidly. In addition to its good appearance, a small image-taking apparatus has advantages in that the apparatus can be carried anywhere without taking up much space, and that images can be easily taken anywhere. Moreover, small high-resolution CCDs and small lenses corresponding to these CCDs have been recently developed, and images with sufficient image quality can be taken even with a small image-taking apparatus.

In the field of single-lens reflex cameras and the like, in a case where dirt is attached to an image-taking lens, or where dust enters the image-taking apparatus, the image-taking apparatus is generally left with a service section of a manufacturer thereof, and is cleaned by a skilled technical personnel. However, because the miniaturization of the image-taking apparatuses has caused more users to carry the image-taking apparatuses, and to take images in daily life, many users dislike leaving their image-taking apparatuses with their respective manufactures. Moreover, the small image-taking apparatuses, which are often carried on a daily basis, are easily soiled. Furthermore, quality of images taken by small image-taking apparatuses are more susceptible to dust and dirt than that of image-taking apparatuses of ordinary size. With such circumstances, development of a technique, which allows lenses and CCDs to be easily cleaned without requiring any special skills, be awaited.

With regard to this point, there is a known technique of vibrating a lens or a CCD with a motor to shake off attached dirt. However, attaching a large motor to vibrate the lens or the CCD causes the size and the weight of the entire image-taking apparatus to be increased considerably. Furthermore, a large battery is required to ensure sufficient electrical power to drive such a vibration driving motor in addition to electrical power to implement an ordinary image-taking function. Accordingly, it is difficult to apply such a technique using vibration to the small image-taking apparatus with small accommodation space.

Japanese Patent Application Publication No. 7-64152 describes a technique for cleaning a lens by attaching a cleaner member to the inside of a lens barrier, and by using the movements respectively of opening and closing of the lens barrier. According to the technique described in Japanese Patent Application Publication No. 7-64152, there is no need to mount an additional motor for vibrating the lens, and the lens can be cleaned while size and power consumption of the image-taking apparatus are reduced.

However, to clean dirt which is firmly attached to the lens, with the technique described in Japanese Patent Application Publication No. 7-64152, the lens barrier needs to be opened and closed many times with a motor. Accordingly, the small image-taking apparatus, on which only a small battery can be mounted, is short of electric power. For this reason, there is a problem that the lens of the apparatus cannot be sufficiently cleaned. With the technique of Japanese Patent Application Publication No. 7-64152, a front lens, which faces the lens barrier, can be cleaned. However, a rear lens and a CCD, which are disposed within the image-taking apparatus, cannot be cleaned. The front lens, which is exposed from the body casing of the image-taking apparatus, can be manually cleaned by a user. Accordingly, it is desired to develop advanced cleaning techniques, specifically, ones that makes it possible to clean the lens and the CCD, which are within the image-taking apparatus, and which cannot be reached by user's hand, with low power consumption.

SUMMARY OF THE INVENTION

The present invention has been made in view of the foregoing circumstances, and provides an image-taking apparatus in which lenses and a CCD can be cleaned with low power consumption while preventing an increase in size of the apparatus.

An image-taking apparatus of the present invention is an image-taking apparatus which captures object light to take an image, and which includes an optical device through which the object light is transmitted; an image pickup device which generates an image signal representing an object image obtained by focusing the object light which has passed through the optical device; a cleaning section which is deformed by receiving a predetermined stimulus, the cleaning section being brought into contact with, and being separated from, the optical element and/or the image pickup device by the deformation to clean a substance attached to a contact portion; a stimulus application section which applies a stimulus to the cleaning section; and a control section which controls the deformation of the cleaning section by controlling the stimulus applied to the cleaning section by the stimulus application section, and which thus causes the cleaning section to clean the contact portion.

According to the image-taking apparatus of the present invention, the cleaning section is deformed by receiving a predetermined stimulus, and is brought into contact with, or is separated from, the optical device and/or the image pickup device. Thereby, the substance attached to the contact portion is cleaned. Accordingly, the present invention can be applied not only to the front lens exposed from the body casing of the image-taking apparatus, but also to the image pickup device and the like accommodated within the image-taking apparatus. Moreover, there is no need to provide a motor for driving the cleaning section or the like. It is therefore made possible to miniaturize the entire image-taking apparatus, and to perform cleaning with low power consumption.

Preferably, the image-taking apparatus according to the present invention further includes a cleaning instruction section which gives an instruction for performing cleaning by the cleaning section according to a user operation. In this case, upon receipt of the instruction for performing cleaning from the cleaning instruction section, the control section causes the stimulus application section to apply the stimulus, and thus causes the cleaning section to perform cleaning.

According to the image-taking apparatus of the preferred aspect of the present invention, it is possible to perform the cleaning only when the optical device and the image pickup device are soiled. Thus, an increase in power consumption is prevented.

Preferably, the image-taking apparatus according to the present invention further includes an image-taking instruction section which gives an instruction for taking an image in the image pickup device according to a user operation. In this case, upon receipt of the instruction for taking an image from the image-taking instruction section, the control section causes the image pickup device to generate an image signal, and rejects the instruction for taking an image from the image-taking instruction section in a case where the instruction for performing cleaning is given by the instruction cleaning section.

The instruction for taking an image is rejected while the image pickup device and the optical device are cleaned. It is therefore made possible to avoid trouble of obtaining an undesired shot image by accidentally pressing an image-taking button during cleaning.

Preferably, the image-taking apparatus according to the present invention further includes a body casing accommodating the image pickup device therein; an optical lens barrel which is provided in front of the body casing, and which accommodates the optical device; and a lens barrel drive section which retracts and extends the optical lens barrel to and from the body casing. The control section rejects the instruction, from the cleaning instruction section, for performing cleaning in a case where the optical lens barrel is retracted within the body casing.

In a state where the optical lens barrel is retracted, various types of components are often arranged with no gaps therebetween within the image-taking apparatus. If cleaning is performed in such a state, the cleaning member, image pickup device and the like may collide with one another, and be damaged. Accordingly, it is preferable that the instruction for performing cleaning be rejected in a case where the optical lens barrel is retracted.

Preferably, in the image-taking apparatus according to the present invention, the control section causes the stimulus application section to apply the stimulus, thereby causing the cleaning section to perform cleaning when the optical lens barrel is extended/retracted by the lens barrel drive section.

According to the image-taking apparatus of the preferred aspect of the present invention, cleaning starts automatically when the optical lens barrel is extended/retracted.

In the image-taking apparatus according to the present invention, preferably, the cleaning section covers a surface of the optical device and/or of the image pickup device when the cleaning section is in contact with the optical device and/or the image pickup device. Moreover, preferably, when the image-taking apparatus is turned off, the control section causes the stimulus application section to apply a stimulus which causes the cleaning section to come into contact with the optical device and/or with the image pickup device.

Covering the optical device and image pickup device with the cleaning section while the image-taking apparatus is turned off reduces a problem where dirt and dust are attached thereon.

Preferably, in the image-taking apparatus according to the present invention, the cleaning section is composed of a polymer actuator.

The polymer actuator has a property of being deformed with a stimulus, and the deformation thereof is large. Accordingly, the polymer actuator can be preferably applied as the cleaning section of the present invention.

Preferably, in the image-taking apparatus according to the present invention, the cleaning section is composed of a polymer actuator which is deformed with ultraviolet light, and the stimulus application section emits ultraviolet light toward the cleaning section.

The application of the polymer actuator, which is deformed with the effect of ultraviolet light, causes cleaning to be reliably performed while an increase in power consumption is prevented.

Preferably, in the image-taking apparatus according to the present invention, the cleaning section includes an adhesive section at a side thereof which comes into contact with the optical device and/or with the image pickup device, and the adhesive section adheres the substance attached to the contact portion.

The adhesive section provided to the cleaning section allows cleaning of dust and dirt to be performed reliably and efficiently.

Preferably, the image-taking apparatus according to the present invention further includes a static electricity application section which charges and discharges the cleaning section with static electricity.

Charging the cleaning section with static electricity ensures removal of dust attached to the image pickup device and to the optical device.

Preferably, in the image-taking apparatus according to the present invention, in response to the stimulus, the cleaning section extends to come into contact with the optical device and/or with the image pickup device, or rolls up to be separated from the optical device and/or from the image pickup device, the control section causes the stimulus application section to apply the stimulus which causes the cleaning section to roll up while the image signal is generated in the image pickup device, and the apparatus further comprises a stopper member which is in contact with the cleaning section while the image signal is generated in the image pickup device, and which thus restrains the cleaning section from extending.

The extension of the cleaning section is thus restrained with the stopper member while image taking is performed. It is therefore made possible to avoid trouble in which the cleaning section appears in the obtained image.

DETAILED DESCRIPTION OF THE INVENTION

Hereinafter, descriptions will be provided for embodiments of the present invention with reference to the drawings.

Figure 1:
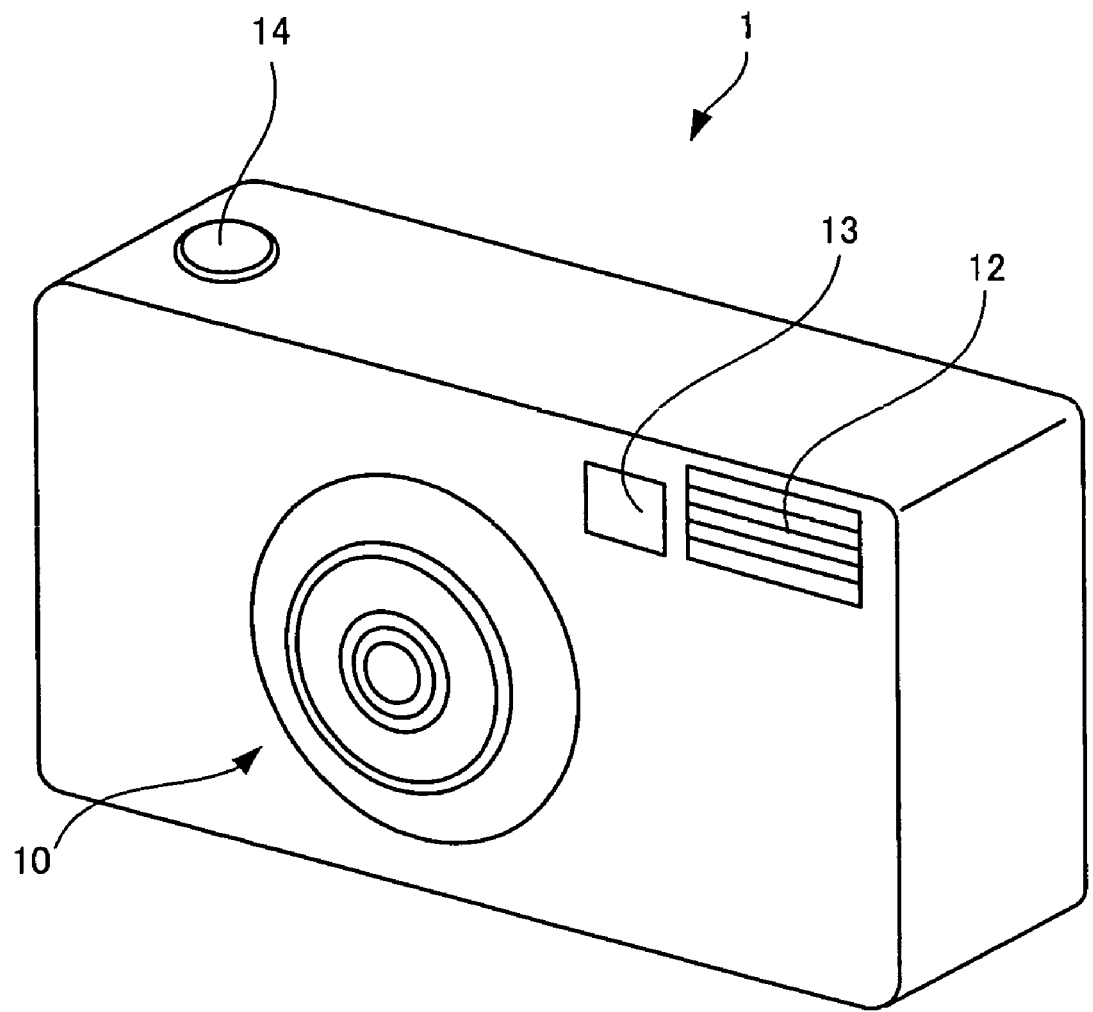
FIG. 1 is a perspective view showing an appearance of a digital camera to which an embodiment of the present invention is applied.
Figure 2:
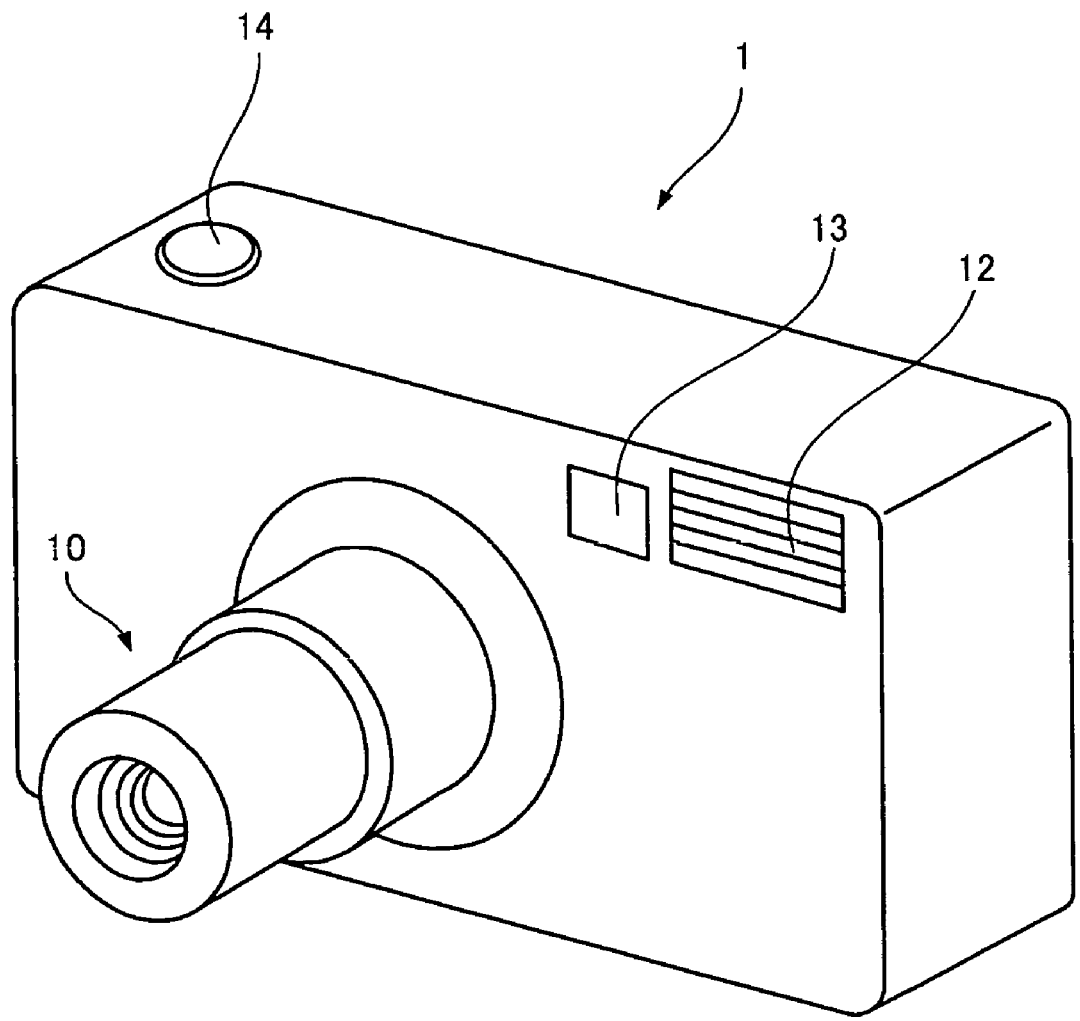
FIG. 2 is a perspective view showing an appearance of the digital camera to which the embodiment of the present invention is applied.

FIGS. 1 and 2 are respectively external perspective views of a digital camera to which an embodiment of the present invention is applied.

FIG. 1 shows a digital camera 1 with a lens barrel 10 being retracted, and FIG. 2 shows the digital camera with the lens barrel 10 being extended. The lens barrel 10 includes an image-taking lens set.

In a front upper part of the digital camera 1 shown in FIGS. 1 and 2, an auxiliary light emitting window 12 and a finder objective window 13 are disposed. A shutter button 14 is provided on a top surface of the digital camera 1.

Various types of switches, such as a zoom operation switch and cross keys, and a LCD (Liquid Crystal Display) which displays images and menu screens, are provided to the unillustrated back surface of the digital camera 1. When the zoom operation switch is kept pressed for a predetermined period of time, the digital camera is caused to be in a zoom operation mode for adjusting an image-taking field angle. In the zoom operation mode, the image-taking lens set moves toward a telescopic side (a tele side) while an "up" key of the cross keys is kept pressed. The image-taking lens set moves toward a pantoscopic side (a wide side) while a "down" key of the cross keys is kept pressed.

Figure 3:
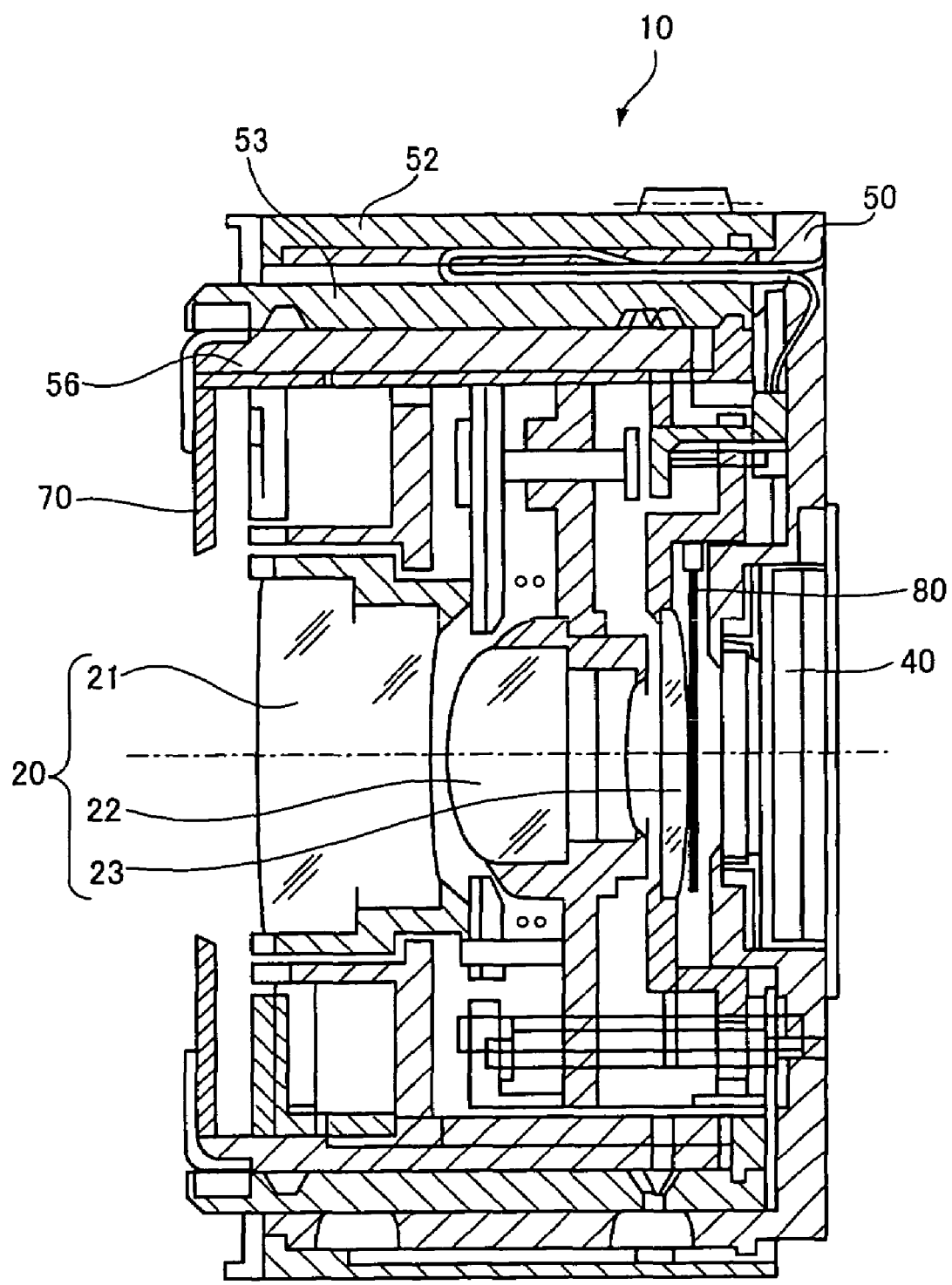
FIG. 3 is a cross-sectional view of a lens barrel of the digital camera in a state where the lens barrel is retracted, the view being taken along an optical axis.
Figure 4:
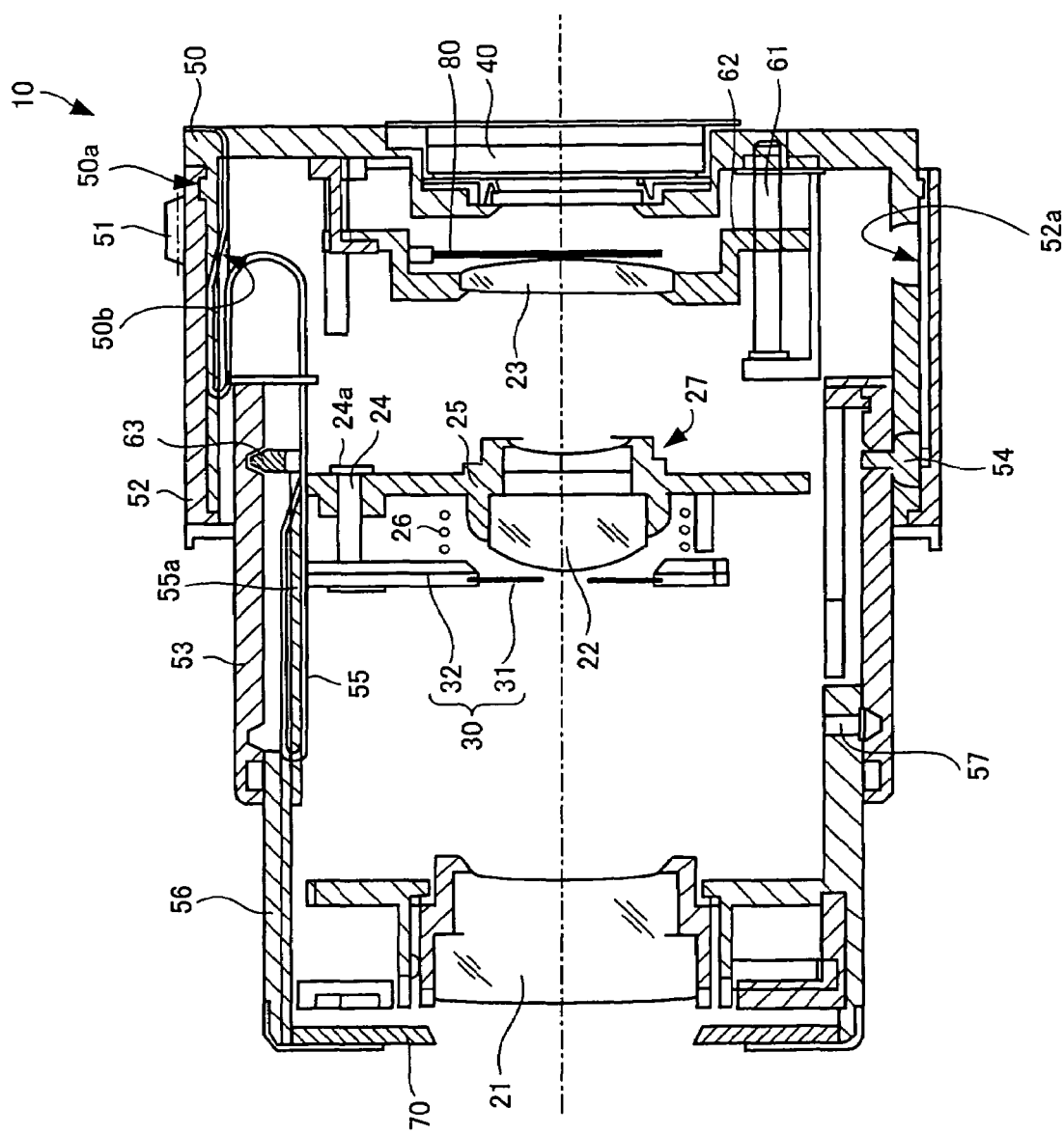
FIG. 4 is a cross-sectional view of the lens barrel of the digital camera in a state where an image-taking lens set thereof is in a wide mode, the view being taken along the optical axis.
Figure 5:
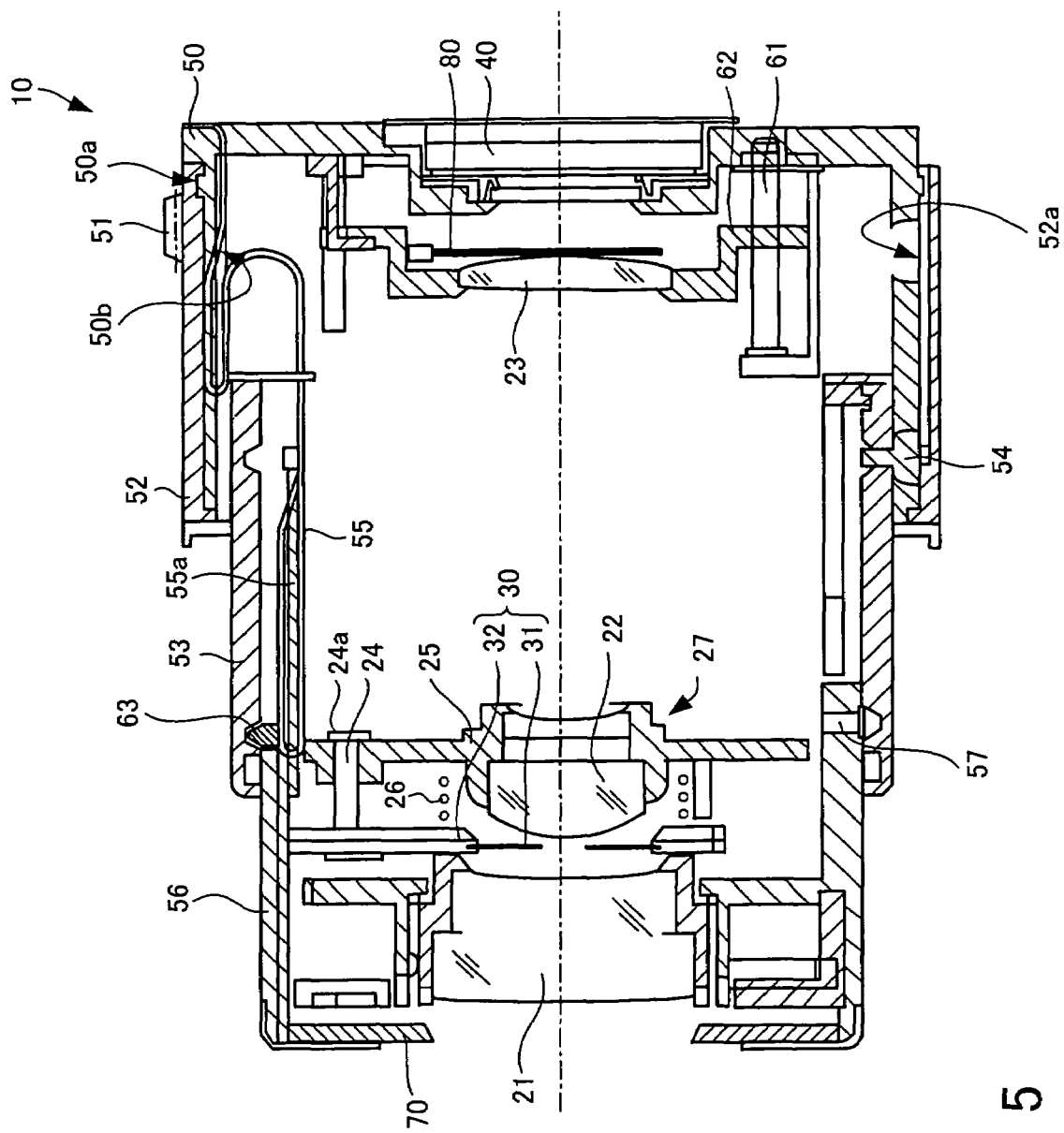
FIG. 5 is a cross-sectional view of the lens barrel of the digital camera in a state where the image-taking lens set is in a tele mode, the view being taken along the optical axis.

FIG. 3 is a cross-sectional view of the lens barrel 10 of the digital camera 1 in a state where the lens barrel 10 is retracted, the view being taken along the optical axis. FIG. 4 is a cross-sectional view of the lens barrel 10 of the digital camera 1 in a state where the image-taking lens set thereof is in a wide mode, the view being taken along the optical axis. FIG. 5 is a cross-sectional view of the lens barrel 10 of the digital cameral 1 in a state where the image-taking lens set thereof is in a tele mode, the view being taken along the optical axis.

Internal space of the lens barrel 10 accommodates the image-taking lens set including three lens groups arranged with optical axes thereof aligned. These three lens groups are a front lens group (a first lens group) 21, a rear lens group (a second lens group) 22, and a focus lens (a third lens group) 23 arranged in order from the front. The image-taking lens set is configured in a way that the rear lens group 22 moves along the optical axis between the wide end shown in FIG. 4 and the tele end shown in FIG. 5. Accordingly, the image-taking field angle is changed. Moreover, the focus lens 23 moves along the optical axis, and carries out focus adjustment. The front lens group 21, the rear lens group 22, and the focus lens 23 are respectively examples of the optical element in the present invention, and the lens barrel 10 corresponds to an example of the optical lens barrel in the present invention.

A cleaning member 80 is attached to the back surface side of the focus lens 23. The cleaning member 80 is deformed in response to application/removal of a voltage, and is brought into contact with, or is separated from, the focus lens 23, thus cleaning the focus lens 23. The cleaning member 80 corresponds to an example of the cleaning member of the present invention. The structure and operational principle of the cleaning member 80 will be described later in detail.

A flare prevention plate 70, which blocks harmful light, is disposed in an area in front of the front lens group 21. A diaphragm unit 30, which adjusts an amount of object light, is disposed between the front and the rear lens groups 21 and 22. A CCD 40, which detects the object light, is disposed in the back of the image-taking lens set. The CCD 40 corresponds to an example of the image pickup device of the present invention.

As shown in FIGS. 4 and 5, the diaphragm unit 30 includes an aperture plate 32 with a hole opened, the hole surrounding the optical axis of the image-taking lens set, and diaphragm blades 31 which narrow and close the hole of the aperture plate 32 to adjust the aperture. The diaphragm unit 30 further includes a guide rod 24, which protrudes rearward from the back of the diaphragm unit 30, and a stopper 24a, which closes the rear end of the guide rod 24. The guide rod 24 penetrates a rear lens group holding frame 25 which holds the rear lens group 22 in a way that the rear lens group holding frame 25 can be slid in a direction of the optical axis. Furthermore, between the diaphragm unit 30 and the rear lens group holding frame 25, a coil spring 26 is attached in a state of being contracted. The diaphragm unit 30 is held with a rear lens group unit 27 in a way that the diaphragm unit 30 is movable along the optical axis in a state of being energized forward by the spring. The rear lens group unit 27 is composed of the rear lens group 22 and the rear lens group holding frame 25. When the lens barrel 10 is being retracted, the diaphragm blades 31 shown in FIGS. 4 and 5 are opened, and the diaphragm unit 30 moves toward the rear lens group unit 27 while compressing the coil spring 26. Thereby, the rear lens group unit 27 enters the hole of the aperture plate 32. The digital camera 1 is thus made thin.

In the digital camera 1 of this embodiment, the lens barrel 10 includes a fixed cylinder 50, a drive cylinder 52, a rotational movement cylinder 53, and a straight movement cylinder 56. The fixed cylinder 50 is fixed to a camera body. The drive cylinder 52 is rotatable with respect to the fixed cylinder 50. The rotational movement cylinder 53 rotates as the drive cylinder 52 is driven. The straight movement cylinder 56 moves straight as the rotational movement cylinder 53 rotates. In a state where the lens barrel 10 is retracted as shown in FIG. 3, the fixed cylinder 50, the drive cylinder 52, the rotational movement cylinder 53, and the straight movement cylinder 56 are accommodated in a nested fashion. On the other hand, in a state where the lens barrel 10 is extended, as shown in FIGS. 4 and 5, the drive cylinder 52 surrounds the fixed cylinder 50, and the fixed cylinder 50, the rotational movement cylinder 53 and the straight movement cylinder 56 are extended in a way that the cylinders partially overlap one another.

Descriptions will be provided for drive of the lens barrel 10 and of the image-taking lens set.

The movement of the drive cylinder 52 in a direction of the optical axis is restricted with respect to the fixed cylinder 50, by a protruded rim 50a engaged with a groove formed on the inner circumferential surface of the drive cylinder 52. The protruded rim 50a is formed on the outer circumferential surface of the fixed cylinder 50 fixed to the camera body, and a gear 51 is provided on the outer circumferential surface of the drive cylinder 52. Rotational drive force is transmitted from a motor (not shown) to the gear 51. Thus, the drive cylinder 52 rotates.

The drive cylinder 52 further includes a key groove 52a which extends in the direction of the optical axis. A pin-shaped cam follower 54, which is fixed to the rotational movement cylinder 53, is inserted into the key groove 52a via a spiral cam groove formed on the fixed cylinder 50. Accordingly, when the drive cylinder 52 rotates, the rotational movement cylinder 53 rotates, and concurrently moves in the direction of the optical axis along the cam groove.

A straight movement frame 55 is provided inside the rotational movement cylinder 53. The straight movement frame 55 is engaged with the rotational movement cylinder 53 in a way that the straight movement frame 55 is movable relative to the movement of the rotational movement cylinder 53. The rotation of the straight movement frame 55 is restricted as the straight movement frame 55 is inserted into the key groove 50b of the fixed cylinder 50. When the rotational movement cylinder 53 rotates, and concurrently moves in the direction of the optical axis along with the rotation of the drive cylinder 52, the straight movement frame 55 moves straight in the direction of the optical axis along with the movement of the rotational movement cylinder 53.

A pin-shaped cam follower 63 is fixed to the rear lens group holding frame 25 which holds the rear lens group 22. The cam follower 63 is inserted into a cam groove of the rotational movement cylinder 53, and is also inserted into a key groove 55a of the straight movement frame 55, the key groove 55a extending in the direction of the optical axis. Thus, when the rotational movement cylinder 53 rotates, and concurrently moves in the direction of the optical axis along with the rotation of the drive cylinder 52, the rear lens unit 27 moves straight in the direction of the optical axis while being guided by a shape of the cam groove of the rotational movement cylinder 53.

As previously described, the diaphragm unit 30 is attached to the rear lens group unit 27 in a state of being energized forward with the coil spring 26. Hence, the diaphragm unit 30 moves in the direction of the optical axis together with the rear lens group unit 27.

Furthermore, the lens barrel 10 includes the straight movement cylinder 56 which holds the front lens group 21. A cam follower 57, which is fixed to the straight movement cylinder 56, is inserted into a cam groove of the rotational movement cylinder 53, and also inserted into the key groove 55a of the straight movement frame 55 which extends in the direction of the optical axis. Thus, when the rotational movement cylinder 53 rotates, and concurrently moves in the direction of the optical axis along with the rotation of the drive cylinder 52, the straight movement cylinder 56 moves straight in the direction of the optical axis while being guided by the shape of the cam groove of the rotational movement cylinder 53 into which the cam follower 57 is inserted.

The lens barrel 10 is thus extended. The lens barrel 10 is retracted by causing the drive cylinder 52 to rotate in the opposite direction. The set composed of the gear 51, the motor provided to the gear 51 and the like, which are provided for extending/retracting the lens barrel 10, corresponds to an example of the lens barrel drive section of the present invention.

The rotational movement cylinder 53 can further rotate with the position of the front lens group 21 being kept even after the extension of the lens barrel 10 is completed. At this time, the rear lens group unit 27 moves in the direction of the optical axis along the cam groove of the rotational movement cylinder 53. Thereby, the image-taking field angle (i.e., a focal distance) is adjusted. FIG. 4 shows the lens barrel 10 completely extended. At this time, the image-taking lens set 20 is in the wide mode. FIG. 5 shows the state where the rotational movement cylinder 53 has further rotated after the extension of the lens barrel 10 is completed. The above state is where the rear lens group unit 27 has moved to the point where the image-taking lens set 20 is set to be in the tele mode.

A lead screw 61 is rotated with an unillustrated motor, and a focus lens holding frame 62, which holds the focus lens 23, is screwed into the lead screw 61. The focus lens 23 moves in the direction of the optical axis along with the rotation of the lead screw 61 for focus adjustment.

Next, the internal structure of the digital camera 1 will be described.

Figure 6:
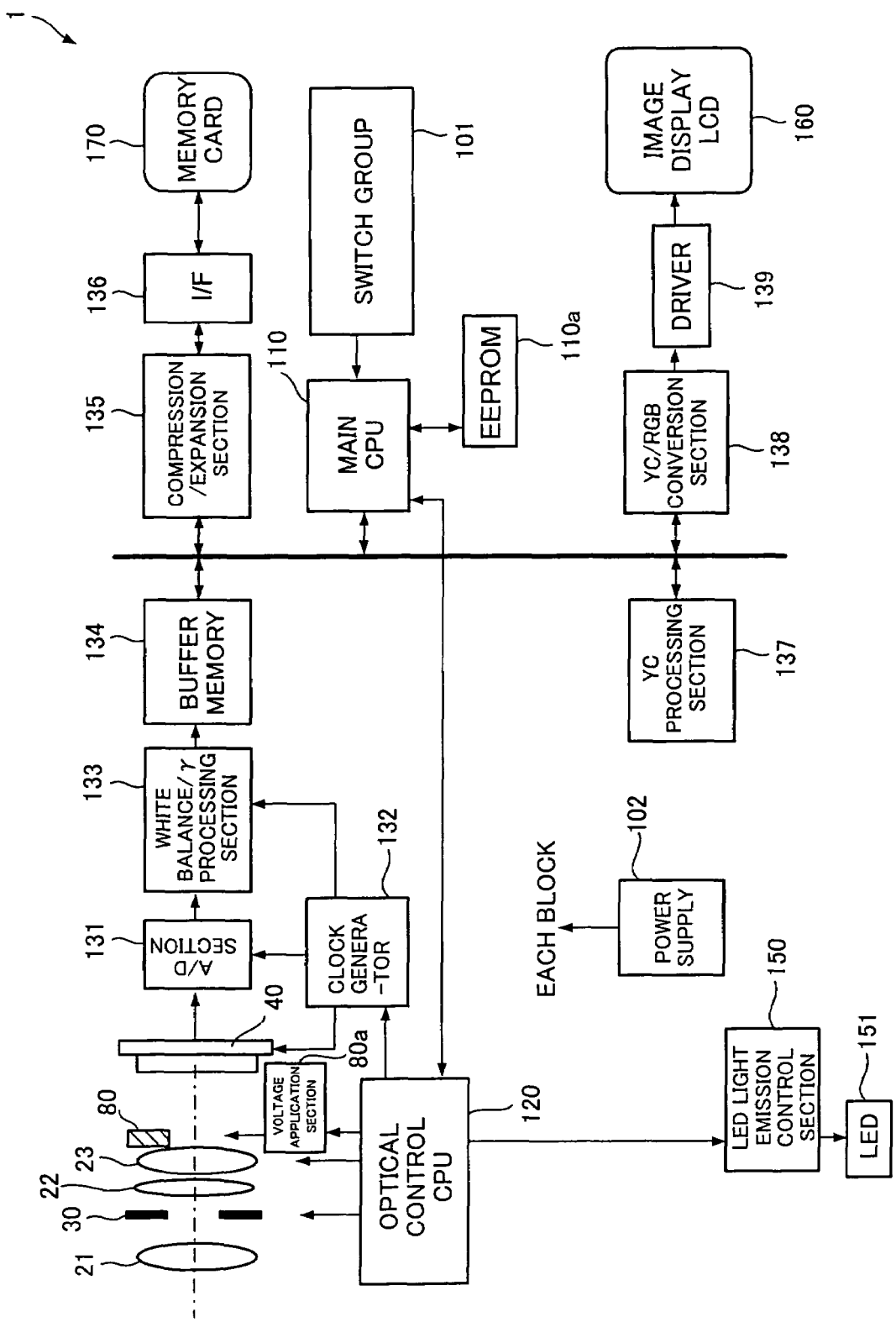
FIG. 6 is a schematic internal block diagram showing the digital camera of FIG. 1.

FIG. 6 is a schematic internal block diagram of the digital camera 1 shown in FIG. 1.

In the digital camera 1 of this embodiment, all of processes are controlled by a main CPU 110. The main CPU 110 is supplied with operation signals from various types of switches (such as the shutter button 14 shown in FIG. 1, the zoom operation switch, and the cross keys, which are collectively referred to as a switch group 101) which are provided to the digital camera 1.

The main CPU 110 includes an EEPROM 110a, in which various types of programs necessary for respectively executing the various processes in the digital camera 1 are written. When a power switch (not shown) included in the switch group 101 is turned on, electric power is supplied from a power supply 102 to each of various kinds of elements of the digital camera 1, and the operation of the entire digital camera 1 is integrally controlled by the main CPU 110 according to a program procedure written in the EEPROM 110a.

First, descriptions will be provided for a flow of an image signal with reference to FIG. 6.

When a photographer specifies an image-taking field angle using cross keys (not shown) provided in the back surface of the digital camera 1, the specified image-taking field angle is transmitted from the switch group 101 to the main CPU 110. In the main CPU 110, a focal distance corresponding to the specified image-taking field angle is calculated, and the calculated focal distance is transmitted to an optical control CPU 120. Data between the main CPU 110 and the optical control CPU 120 is not exchanged through a bus 140, but is exchanged through inter-CPU communication at high speed.

Receiving the focal distance transmitted from the main CPU 110, the optical control CPU 120 controls an unillustrated motor and the like to extend the lens barrel 10 as shown in FIGS. 4 and 5, and to move the rear lens group 22 to the position corresponding to the transmitted focal distance. Moreover, the optical control CPU 120 controls an unillustrated motor and the like to move the focus lens 23, which is shown in FIGS. 3 to 5, in the optical axis direction. The optical control CPU 120 corresponds to an example of the control section of the present invention.

When the lens barrel 10 is extended, the optical control CPU 120 instructs a voltage application section 80a to apply a voltage. When the voltage application section 80a applies the voltage, the cleaning member 80 is deformed, and is bent to be moved to such a position that the cleaning member 80 does not block the object light. The voltage application section 80a corresponds to an example of the stimulus application section of the present invention.

The object light passes through the image-taking lenses and diaphragm unit 30, and thus the image is formed on the CCD 40. An image signal representing an object image is generated by the CCD 40. The generated image signal, which is an analog signal, is roughly read by an A/D section 131, and is then converted into a digital signal. Accordingly, a low-resolution through image data is generated. The generated through image data with low resolution is subjected to image processing, such as white balance correction and γ correction, in a white balance/γ processing section 133.

The CCD 40 is supplied with a timing signal from a clock generator 132, and image signals are generated in synchronization with the timing signal at predetermined intervals. The clock generator 132 outputs the timing signal based on an instruction transmitted from the main CPU 110 via the optical control CPU 120. The timing signal is supplied not only to the CCD 40, but also to the A/D section 131 at the subsequent stage, and to the white balance/γ processing section 133. Accordingly, in the CCD 40, in the A/D section 131, and in the white balance/γ processing section 133, the processing of the image signals is swiftly performed in sequence, in synchronization with the timing signal outputted from the clock generator 132.

Image data, to which the image processing has been performed in the white balance/γ processing section 133, is once stored in a buffer memory 134. The low-resolution through image data stored in the buffer memory 134 is supplied through the bus 140 to a YC/RGB conversion section 138. The through image data is transmitted in order from that stored the earliest to that stored later. Since the through image data is a RGB signal, the through image data is not processed in the YG/RGB conversion section 138. The through image data is then directly transmitted via the driver 139 to an image display LCD 160, on which a through image represented by the through image data is displayed. In this event, since the CCD 40 detects the object light, and generates the image signals at predetermined timings, the object light in the direction in which the image-taking lens set is faced continues to be displayed as an object image.

The through image data stored in the buffer memory 134 is supplied to the main CPU 110. On the basis of the through image data, the main CPU 110 detects contrast of the object images which are represented by the image signals repeatedly obtained by the CCD 40, and brightness of the object, while the focus lens 23 moves along the optical axis. The detected contrast and brightness are transmitted to the optical control CPU 120.

The optical control CPU 120 moves the focus lens 23 to such a lens position that the contrast transmitted from the main CPU 110 is maximized (AF processing), and adjusts a diaphragm value of the diaphragm unit 30 according to the brightness transmitted from the main CPU 110 (AE processing).

At this time, when the photographer presses the shutter button 14 shown in FIG. 1 while checking the through image displayed on the image display LCD 160, information indicating that the shutter button 14 has been pressed is transmitted to the main CPU 110, and is further transmitted to the optical control CPU 120. When the object is in the dark, an instruction for causing light to be emitted is transmitted from the optical control CPU 120 to an LED light emission control section 150. Thereby, a flash is emitted from an LED 151 in synchronization with the press of the shutter button 14. The image signals generated in the CCD 40 are finely read in the A/D section 131 according to an instruction from the optical control CPU 120, and shot image data at high resolution is generated. The generated shot image data is subjected to image processing in the white balance/γ processing section 133, and is stored in the buffer memory 134.

The shot image data stored in the buffer memory 134, which is a RGB signal, is supplied to the YC processing section 137, and is converted into a YC signal. The shot image data converted into the YC signal is subjected to compression processing in a compression/expansion section 135, and the compressed shot image data is stored in a memory card 170 via an I/F 136.

After being subjected to expansion processing in the compression/expansion section 135, the shot image data stored in the memory card 170 is converted into a RGB signal in the YC/RGB conversion section 138, and is then transmitted to the image display LCD 160 via the driver 139. On the image display LCD 160, a shot image represented by the shot image data is displayed.

The digital camera 1 is configured as described above.

In the digital camera 1 of the embodiment, the focus lens 23 is cleaned by applying the voltage to, and by removing the voltage from, the cleaning member 80. First, descriptions will be provided for the structure of the cleaning member 80 and for a method of the cleaning with the cleaning member 80.

Figure 7:
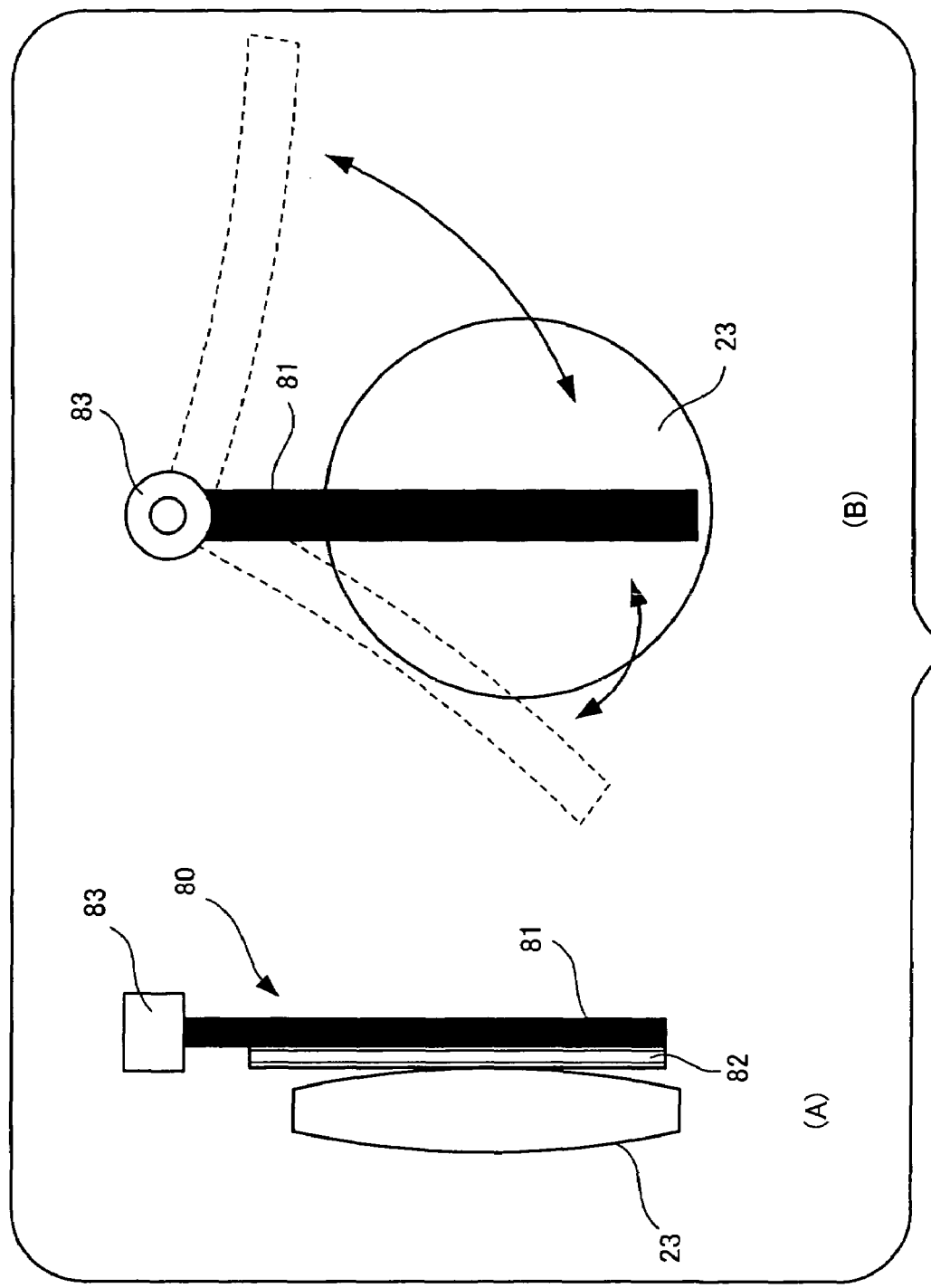
FIG. 7 is a view for explaining a method of cleaning with a cleaning member.

FIG. 7 is a view for explaining the method of cleaning with the cleaning member 80.

Part (A) of FIG. 7 shows a side view of the focus lens 23 and cleaning member 80. The cleaning member 80 includes a polymer actuator 81 and a brush 82. When voltage is applied to the polymer actuator 81, the polymer actuator 81 is bent toward the direction in accordance with the polarity of the applied voltage. The brush 82 is provided to a side of the cleaning member 80, the side being in contact with the focus lens 23. To the cleaning member 80, a charger 83, which charges and discharges the brush 82, is attached. The charger 83 corresponds to an example of the static electricity application section of the present invention. The polymer actuator 81 applicable to this embodiment will be collectively described later.

Part (B) of FIG. 7 shows a view of the focus lens 23 and the cleaning member 80 as viewed from the back surface of the digital camera 1.

The cleaning member 80 normally has a stick shape extending straight. When the voltage is applied to the cleaning member 80, the polymer actuator 81 is bent toward the direction in accordance with the polarity of the voltage, and the brush 82 rubs the surface of the focus lens 23. Thus, the focus lens 23 is cleaned.

Figure 8:
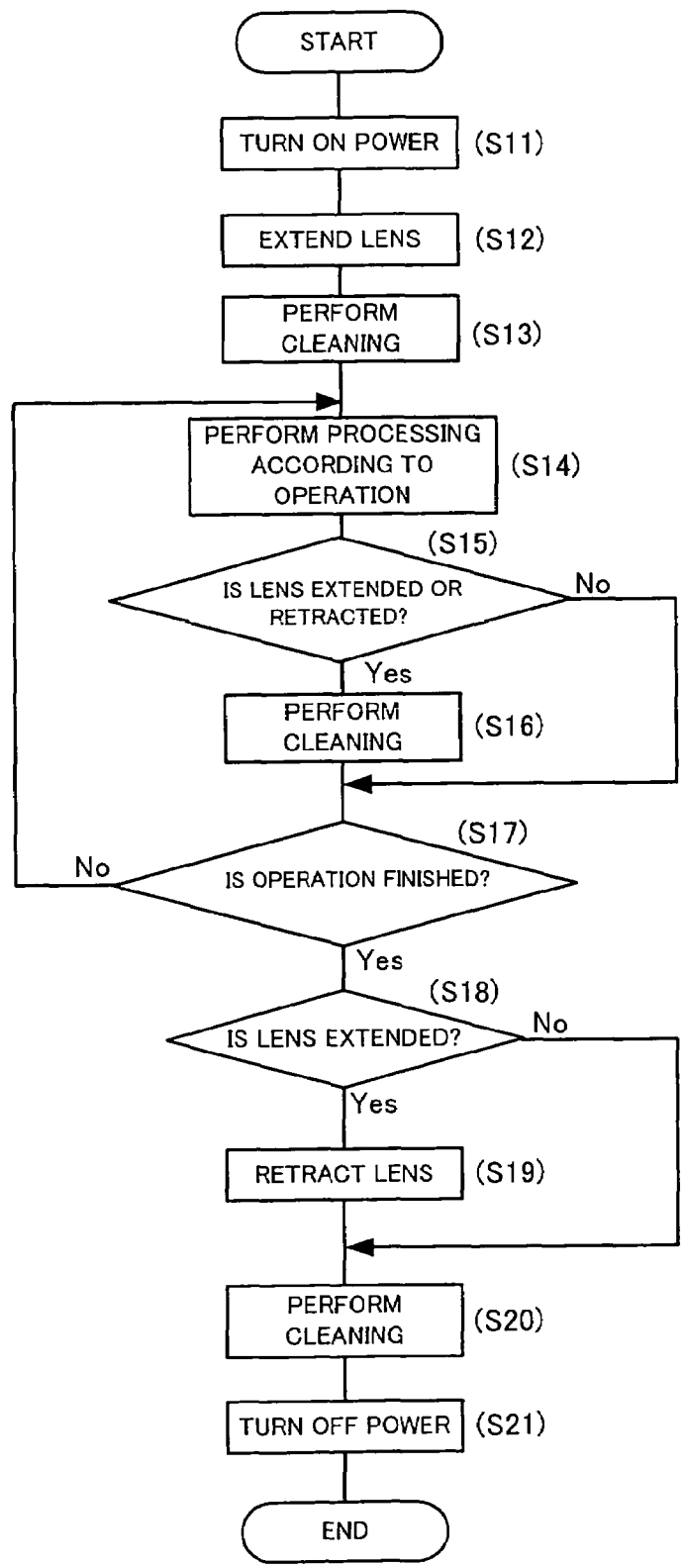
FIG. 8 is a flowchart showing a flow of a series of cleaning processes with the cleaning member.

FIG. 8 is a flowchart showing a flow of a series of cleaning processes with the cleaning member 80.

When the user presses the power switch (not shown) of the digital camera 1, information indicating that the power has been turned on is transmitted from the switch group 101 shown in FIG. 6 to the main CPU 110. Hence, power is supplied from the power supply 102 to each of the various kinds of elements of the digital camera 1 (step S11 of FIG. 8).

When the power is supplied, the lens barrel 10 is extended as shown in FIGS. 4 and 5 (step S12 of FIG. 8), and an instruction for causing the voltage to be applied is transmitted from the optical control CPU 120 to the voltage application section 80a.

The voltage application section 80a applies the voltage to the cleaning member 80 while changing the polarities thereof at predetermined timings, and the charger 83 charges the brush 82. Consequently, as shown in the part (B) of FIG. 7, the polymer actuator 81 is alternately bent to the right and to the left, and the charged brush 82 efficiently cleans dust and dirt attached to the focus lens 23 (step S13 of FIG. 8).

When a predetermined period of time has elapsed after the start of cleaning, an instruction for causing the voltage application to be stopped is transmitted from the optical control CPU 120 to the voltage application section 80a. Thus, the cleaning is terminated.

Subsequently, various processes, such as the image taking of the object and the reproduction of the shot image, are executed according to a switch operation by the user (step S14 of FIG. 8). At this time, in a case where the user gives an instruction for causing the lens barrel 10 to be retracted or extended (step S15 of FIG. 8: Yes), the lens barrel 10 is retracted or extended by the optical control CPU 120 as shown in FIGS. 3 to 5. Concurrently, the instruction for causing the voltage to be applied is transmitted from the optical control CPU 120 to the voltage application section 80a. Thereby, the cleaning is executed in a similar way to step S13 (step S16 of FIG. 8).

As described above, according to the digital camera 1 of the embodiment, the cleaning is automatically performed when the lens barrel 10 is retracted or extended. It is therefore possible to provide a shot image with high quality on all occasions.

When the user presses the power switch (not shown), information indicating that the power supply has been disconnected is transmitted from the switch group 101 shown in FIG. 6 to the main CPU 110 (step S17 of FIG. 8: Yes). In a case where the lens barrel 10 is extended at this time (step S18 of FIG. 8: Yes), the lens barrel 10 is retracted by the optical control CPU 120 as shown in FIG. 3 (step S19 of FIG. 8), and the cleaning is executed in a similar way to steps S13 and S16 (step S20 of FIG. 8).

When the cleaning is terminated and the lens barrel 10 is completely retracted, the supply of power from the power supply 102 to each of the various elements of the digital camera 1 is stopped (step S21 of FIG. 8).

In the digital camera 1 of this embodiment, the cleaning member 80 is driven by the polymer actuator 81, which is bent in accordance with the applied voltage. This polymer actuator 81 is smaller, and requires less power consumption than the conventional motor and the like. It is therefore possible to prevent the digital camera 1 from increasing in size, and to carry out the cleaning with lower power consumption.

This completes the descriptions for the first embodiment of the present invention, and descriptions will now be provided for a second embodiment of the present invention. The second embodiment of the present invention has a structure substantially identical to that of the first embodiment. In the second embodiment, however, the shape of the cleaning member and the method of driving thereof are different from those of the first embodiment. Hereinafter, elements identical to those of the first embodiment are given identical reference numerals, and descriptions thereof are omitted. The following descriptions are focused on differences from the first embodiment.

Figure 9:
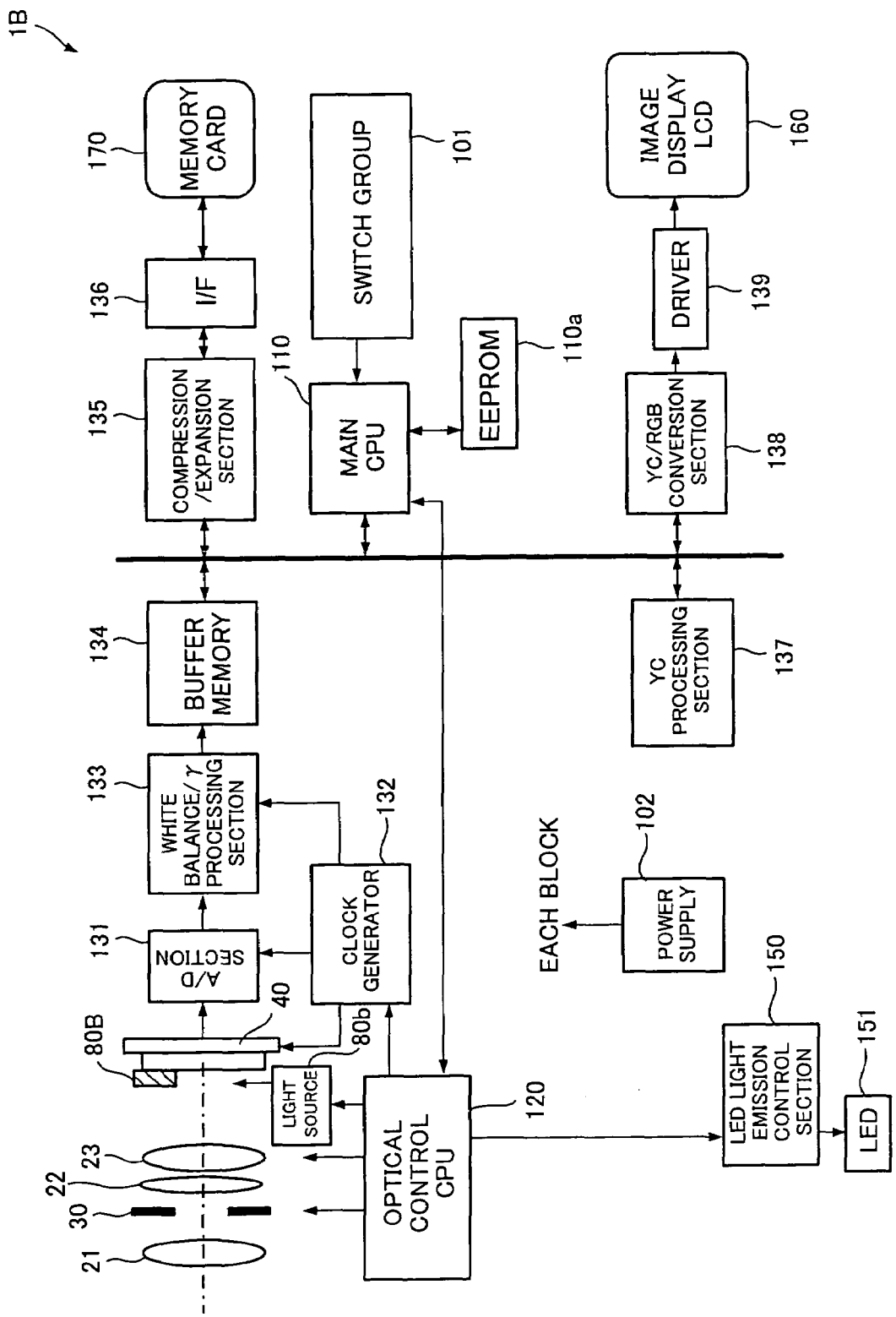
FIG. 9 is a schematic internal block diagram showing a digital camera according to a second embodiment of the present invention.

FIG. 9 is a schematic internal block diagram of a digital camera 1B as the second embodiment of the present invention.

The digital camera 1B of this embodiment has a structure substantially identical to that of the digital camera 1 of the first embodiment shown in FIG. 6. However, the digital camera 1B includes a cleaning member 80B which is deformed by irradiation of light, instead of the cleaning member 80 (see FIG. 6) which is bent in response to application/removal of the voltage. The digital camera 1B further includes a light source 80b which irradiates the cleaning member 80B with light. The cleaning member 80B also corresponds to an example of the cleaning section of the present invention, and the light source 80b corresponds to an example of the stimulus application section of the present invention. In the digital camera 1B, the cleaning member 80B is attached not to the focus lens 23 but to the CCD 40.

Figure 10:
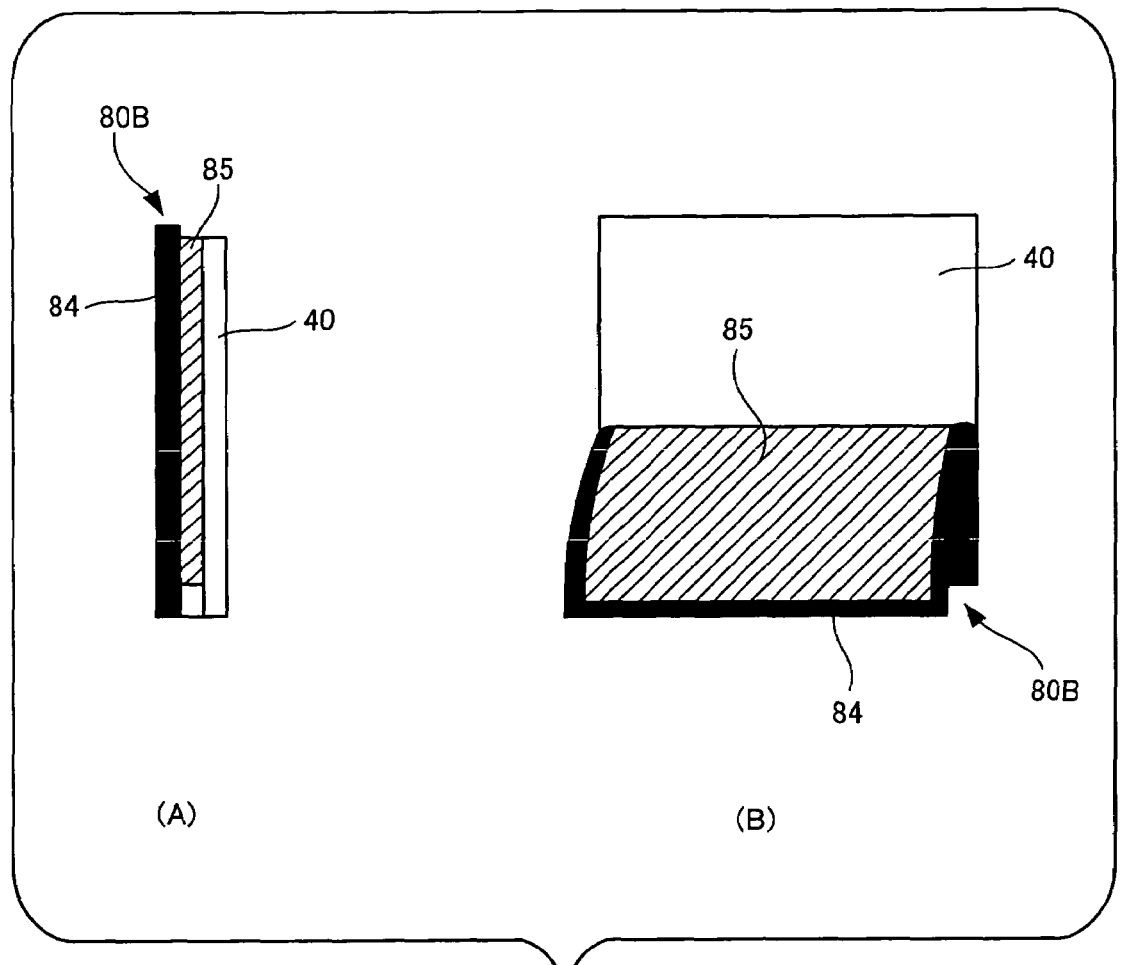
FIG. 10 is a view showing a structure of the cleaning member.

FIG. 10 is a view showing a structure of the cleaning member 80B.

Part (A) of FIG. 10 is a side view of the cleaning member 80B, and part (B) of FIG. 10 is a rear view of the cleaning member 80B.

The cleaning member 80B includes an optically driven polymer actuator 84 which is bent upon exposure to ultraviolet light, and an adhesive layer 85 which is provided to a surface facing the CCD 40. The adhesive layer 85 corresponds to an example of the adhesive section of the present invention.

The cleaning member 80B has a broad shape which covers the CCD 40. Upon exposure to visible light, the cleaning member 80B extends straight, and comes into contact with the CCD 40 as shown in the part (A) of FIG. 10. Upon exposure to ultraviolet light, the cleaning member 80B is bent and peeled off as shown in part (B) of FIG. 10.

Figure 11:
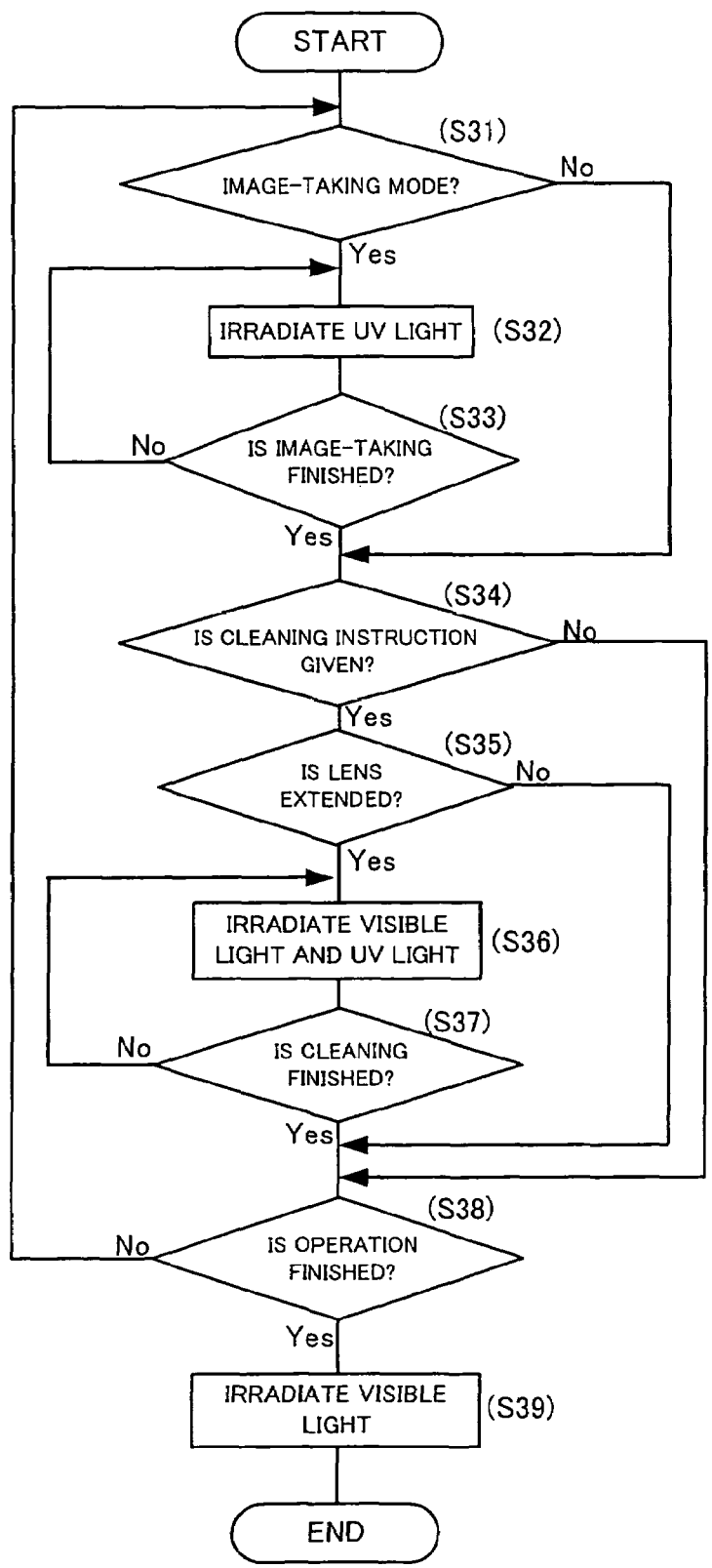
FIG. 11 is a flowchart showing a flow of a series of cleaning processes with the cleaning member.
Figure 12:
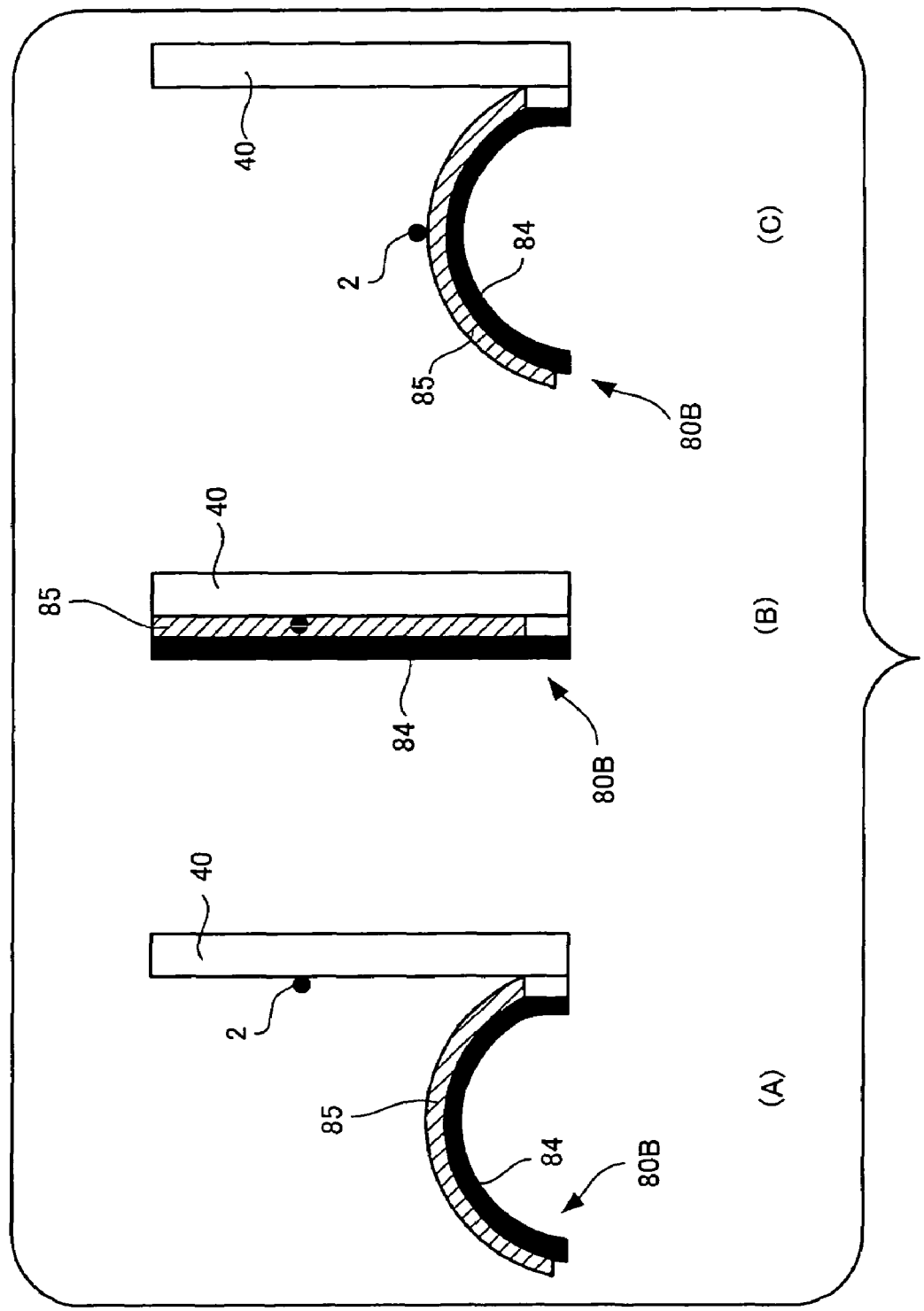
FIG. 12 is a view showing an operation of the cleaning member.

FIG. 11 is a flowchart showing a flow of a series of cleaning processes with the cleaning member 80B, and FIG. 12 is a view showing an operation of the cleaning member 80B.

In the digital camera 1B of this embodiment, cleaning starts by a cleaning instruction from the user.

When the user selects an image-taking mode for taking an image of the object (step S31 of FIG. 11: Yes), the lens barrel 10 is extended by the optical control CPU 120 as shown in FIGS. 4 and 5. The optical control CPU 120 instructs the light source 80b to emit ultraviolet light.

When being irradiated with ultraviolet light by the power source 80b, the cleaning member 80B is bent as shown in part (A) of FIG. 12 to be moved to such a position that the cleaning member 80B does not block the object light (step S32 of FIG. 11). As a result, the object light having passed through the image-taking lens set is reliably received by the CCD 40.

When the user presses the shutter button 14, the object light is detected by the CCD 40, and image taking starts. The shutter button 14 corresponds to an example of the image-taking instruction section of the present invention.

When the user selects the cleaning instruction while the image-taking mode is selected (step S33 of FIG. 11: No), the selected cleaning instruction is not accepted, and is rejected. Not accepting the cleaning instruction during the image-taking as described above avoids trouble of obtaining an undesired image with the cleaning member shot therein.

When the user selects an operation mode other than the image-taking mode, the image-taking mode is terminated (step S33 of FIG. 11: Yes).

When the user gives the cleaning instruction using the cross keys (not shown) (step S34 of FIG. 11: Yes), the cleaning instruction is transmitted from the switch group 101 of FIG. 9 to the main CPU 110. Each of the cross keys of the switch group 101 corresponds to an example of the cleaning instruction section of the present invention.

At this time, it is determined in the optical control CPU 120 whether the lens barrel 10 is extended (step S35 of FIG. 11). In a case where the lens barrel 10 is retracted (step S35 of FIG. 11: No), the cleaning instruction is rejected. In a state where the lens barrel 10 is retracted, the various types of components constituting the digital camera 1B are arranged with no gaps therebetween. Permitting the cleaning instruction only in a case where the lens barrel 10 is extended makes it possible to avoid trouble of damaging the cleaning member 80B and various types of components by collision thereof with one another.

In a case where the lens barrel 10 is extended (step S35 of FIG. 11: Yes), the optical control CPU 120 instructs the light source 80b to alternately emit ultraviolet light and visible light at predetermined timings.

When being irradiated with visible light by the light source 80b, the cleaning member 80B extends straight as shown in the part (B) of FIG. 12, and thus the adhesive layer 85 is in contact with the CCD 40. Furthermore, when being irradiated with ultraviolet light by the light source 80b, the cleaning member 80B is bent as shown in part (C) of FIG. 12. Thereby, dust 2 attached to the CCD 40 is removed (step S36 of FIG. 11). The adhesive layer 85 provided to the cleaning member 80B makes it possible to improve the cleaning performance.

In a case where the user gives an instruction for taking an image during the cleaning (step S37 of FIG. 11: No), the instruction for taking an image is rejected. During the image taking, the various types of components accommodated in the digital camera 1B are driven. For this reason, the driven components may collide with the cleaning member 80B. Rejecting the instruction for taking an image during the cleaning makes it possible to prevent damages to the cleaning member 80B and the like.

When a predetermined period of time has elapsed, the optical control CPU 120 instructs the light source 80b to stop irradiation of light, and light emission from the light source 80b is stopped. Thus, the cleaning is terminated (step S37 of FIG. 11: Yes).

When the user presses the power switch (not shown) (step S38 of FIG. 11: Yes), the optical control CPU 120 instructs the light source 80b to emit visible light. When being irradiated with visible light by the light source 80b, as shown in part (B) of FIG. 12, the cleaning member 80B extends straight, and covers the CCD 40 (step S39 of FIG. 11). Moreover, the power supplied from the power source 102 to each of the various kinds of elements of the digital camera 1B is stopped.

Extending the cleaning member 80B straight when the power supply is disconnected makes it possible to prevent the cleaning member 80B from being an obstruction within the digital camera 1B, and to further prevent dust from being attached to the CCD 40.

This completes the descriptions for the second embodiment of the present invention, and descriptions will now be provided for a third embodiment of the present invention. The third embodiment of the present invention has a structure substantially identical to that of the second embodiment. In the third embodiment, however, the shape of the cleaning member is different from the second embodiment. The following descriptions will be provided only for differences from the first and second embodiments.

Figure 13:
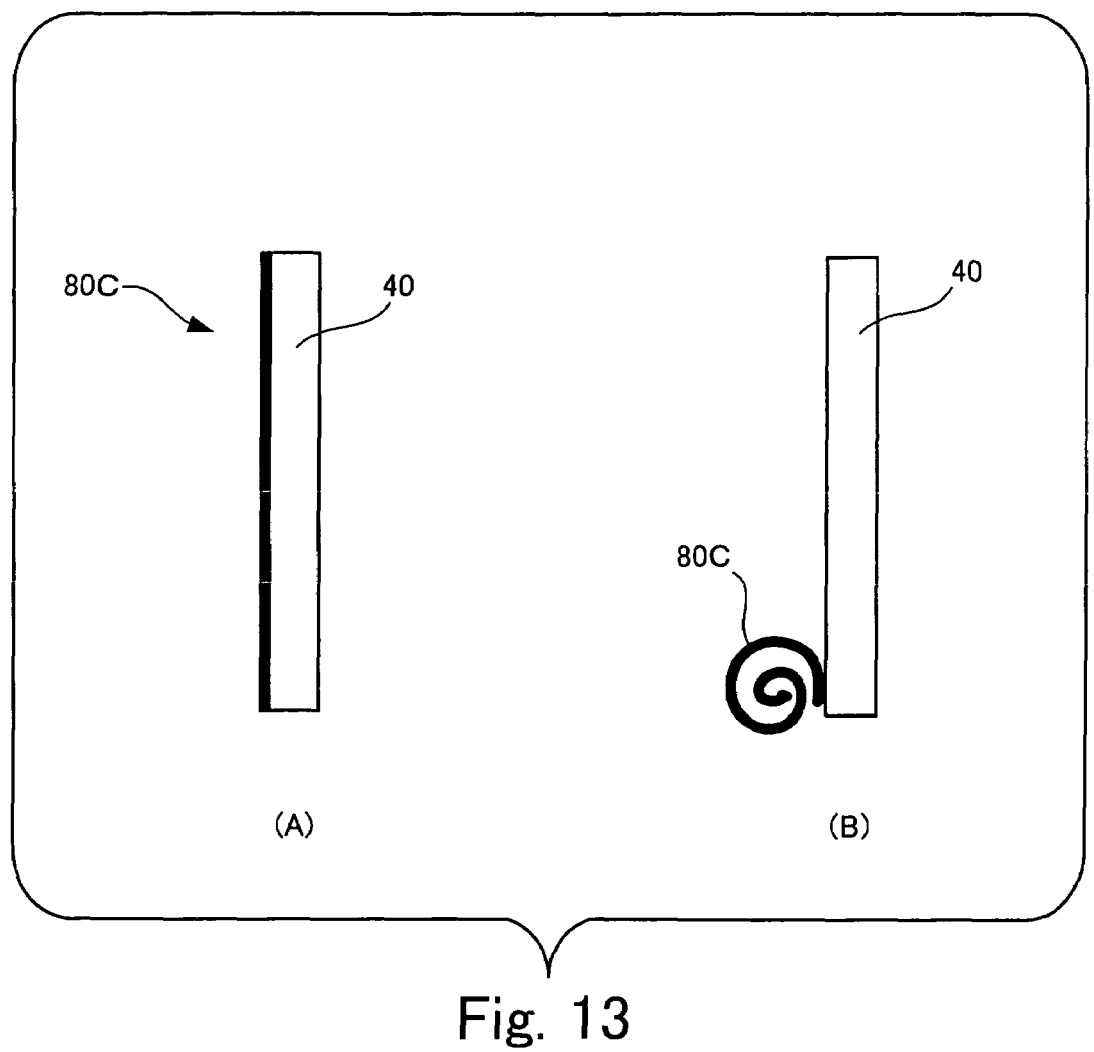
FIG. 13 is a view showing a structure of a cleaning member according to a third embodiment of the present invention.

FIG. 13 is a view showing a structure of a cleaning member 80C of the third embodiment of the present invention.

The cleaning member 80C of this embodiment is composed of a polymer actuator which is deformed upon exposure to light as in the case with the cleaning member 80B of the second embodiment shown in FIG. 12. However, the cleaning member 80C does not include the adhesive layer 85, and is made thinner than the cleaning member 80B.

When being irradiated with visible light, the cleaning member 80C extends as shown in part (A) of FIG. 13, and covers the surface of the CCD 40. When being exposed to ultraviolet light, the cleaning member 80C is rolled up as shown in part (B) of FIG. 13, and is moved to such a position that the cleaning member 80C does not block the object light to be received by the CCD 40.

Figure 14:
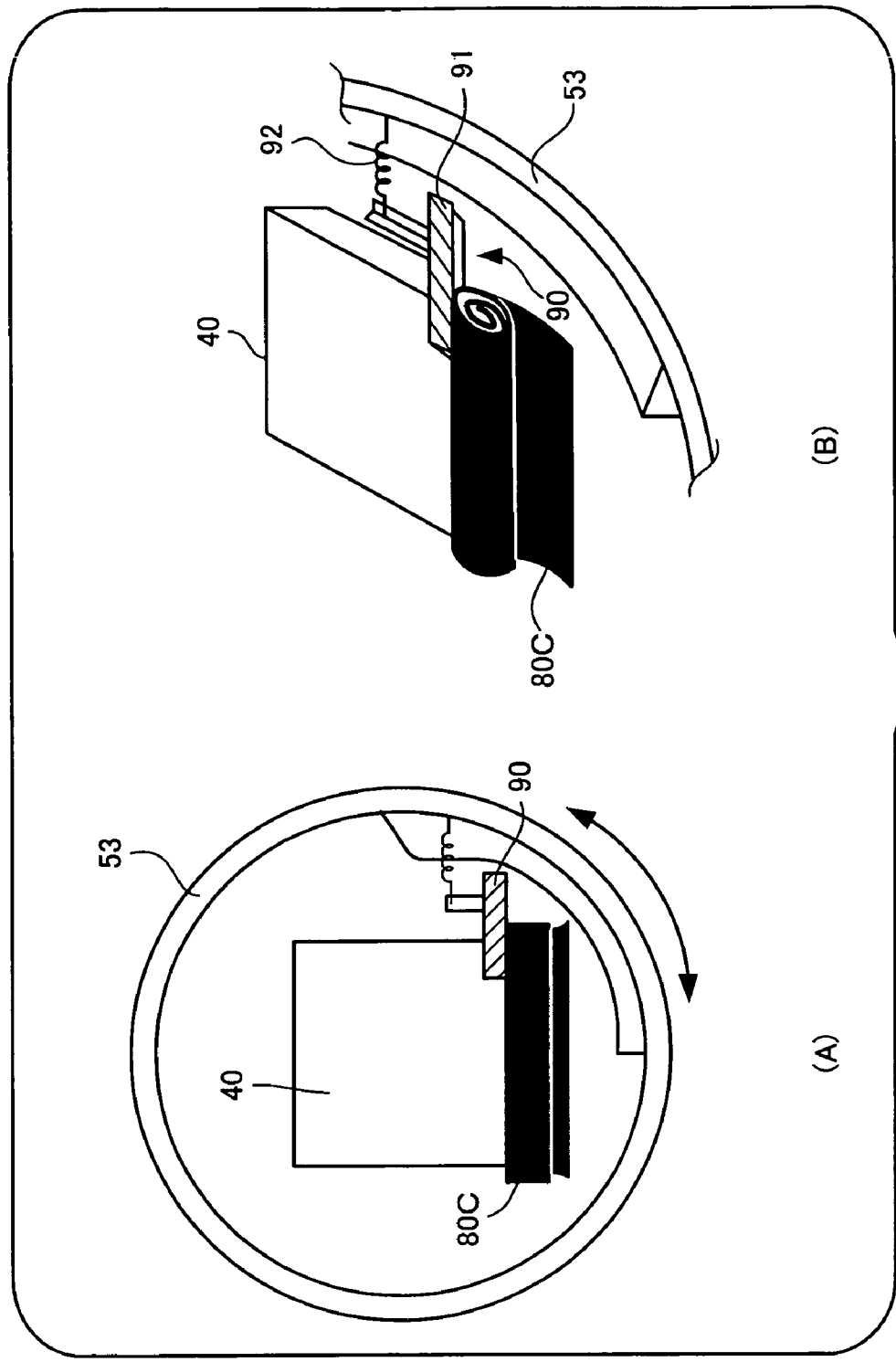
FIG. 14 is a schematic front view showing a structure of a part of the digital camera where the cleaning member is disposed.

FIG. 14 is a schematic front view showing a structure of a part of the digital camera of this embodiment around the cleaning member 80C.

As shown in part (A) of FIG. 14, the cleaning member 80C has a rolled end held with a stopper member 90. The stopper member 90 corresponds to an example of the stopper member of the present invention. As shown in part (B) of FIG. 14, the stopper member 90 includes an abutting section 91 and a spring 92, and is attached to the rotational movement cylinder 53 shown in FIGS. 3 to 5.

The cleaning member 80C of this embodiment is driven as follows.

In a state where the lens barrel is retracted, the stopper member 90 is disposed in a waiting position where the stopper member 90 is not in contact with the cleaning member 80C. In this state, the cleaning member 80C is extended, and covers the CCD 40.

When the user selects the image-taking mode for taking an image of the object, the lens barrel 10 is extended as shown in FIGS. 4 and 5 by the optical control CPU 120. At this time, the cleaning member 80C is alternately irradiated with ultraviolet light and infrared light in accordance with an instruction from the optical control CPU 120. Thus, dust and the like attached to the CCD 40 are cleaned.

When the cleaning is finished, the cleaning member 80C is rolled up. At this time, the lens barrel 10 is extended, and the rotational movement cylinder 53 is rotated. Thereby, the stopper member 90, which is attached to the rotational movement cylinder 53, is moved to the end of the cleaning member 80C.

According to this embodiment, the cleaning member 80C is held by the stopper member 90 during the image taking and the like. Thus, trouble of causing the cleaning member 80C to be extended is reliably avoided.

This completes the descriptions for the third embodiment of the present invention, and descriptions will now be provided for a fourth embodiment of the present invention. In the fourth embodiment of the present invention, a cleaning member identical to that of the second embodiment shown in FIG. 10 is used. However, the place where the cleaning member is disposed is different from that of the second embodiment.

The digital camera of this embodiment has a structure substantially identical to the digital camera 1 of the first embodiment shown in FIGS. 3 to 5. However, the front lens group 21 of this embodiment includes a lens cover with the cleaning member attached thereto.

Figure 15:
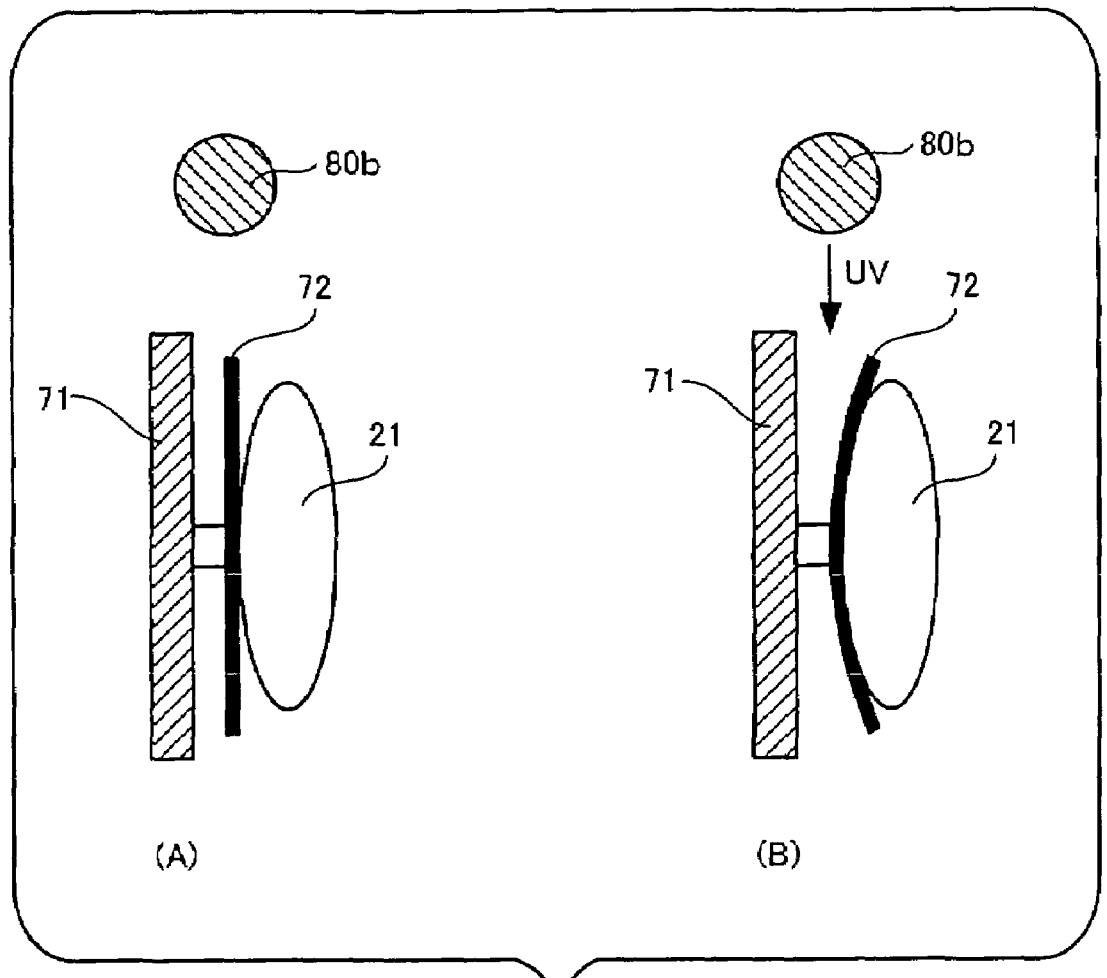
FIG. 15 is a schematic view showing a structure of a part of a digital camera around a front lens group in a fourth embodiment of the present invention.

FIG. 15 is a schematic view of the structure of a part of the digital camera of this embodiment around the front lens group.

As shown in part (A) of FIG. 15, the front lens group 21 includes the lens cover 71 on the front face thereof. A cleaning member 72 is provided at a side of the lens cover 71 facing the front lens group 21, and is in contact with the front lens group 21.

In the digital camera of this embodiment, when the user presses the power switch to give an instruction to disconnect the power supply, the optical control CPU 120 instructs the light source 80b to emit ultraviolet light, and ultraviolet light is emitted from the light source 80b. As a result, the cleaning member 72 is bent, and covers the front lens group 21.

While the image-taking apparatus is turned off and not in use, the front lens group 21 is covered with the cleaning member 72. Thus, dust is prevented from being attached to the lenses and the like.

This completes the descriptions for the fourth embodiment of the present invention, and descriptions will now be provided for a fifth embodiment of the present invention. In the fifth embodiment of the present invention, a polymer actuator which swells by receiving a stimulus is used, instead of the polymer actuator which is bent by receiving the stimulus.

Figure 16:
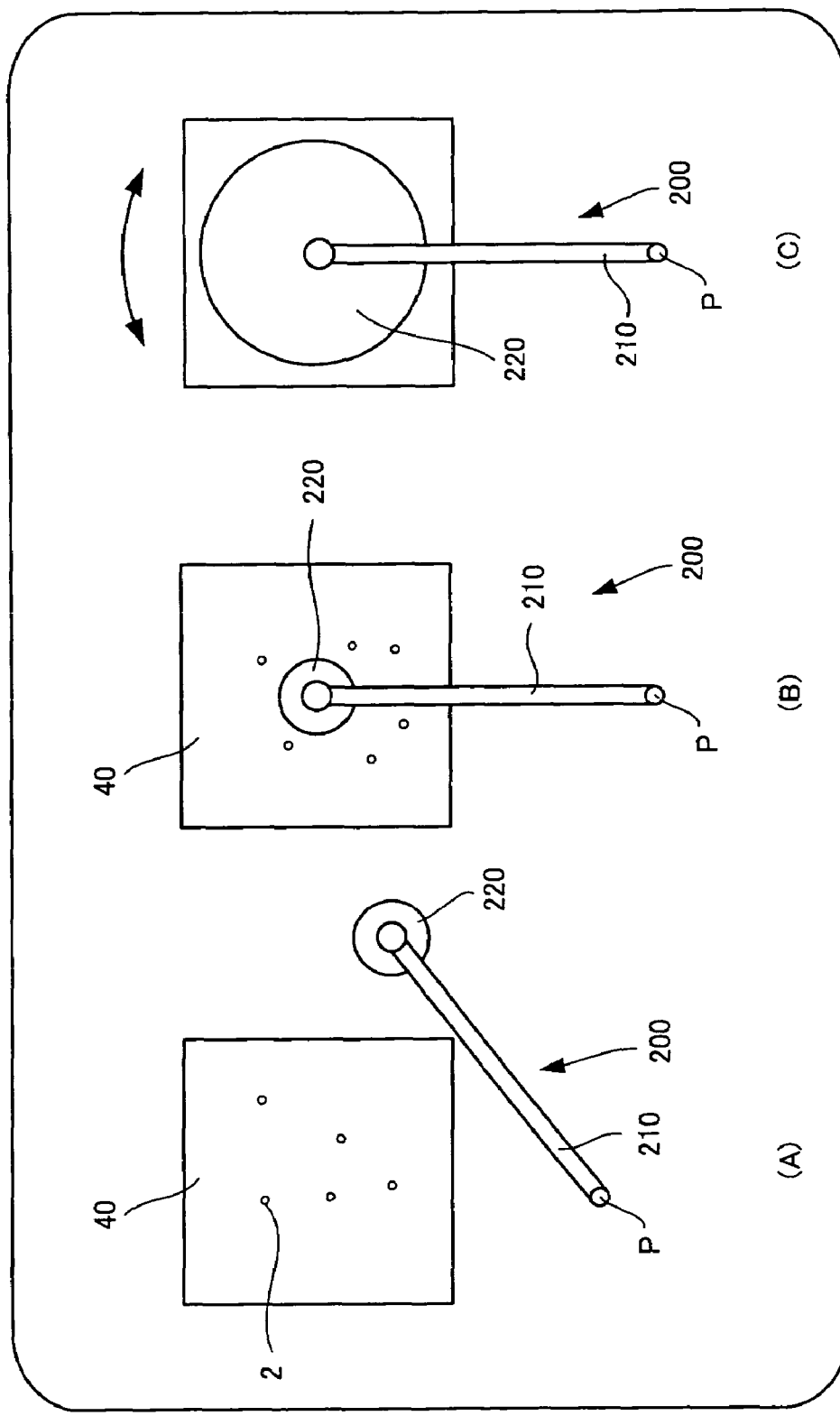
FIG. 16 is a view showing a structure and an operation of a cleaning member in a fifth embodiment of the present invention.

FIG. 16 is a view showing a structure and an operation of the cleaning member of this embodiment.

The cleaning member 200 of this embodiment includes a support stick 210 and a polymer actuator 220. The support stick 210 is rotated with a motor around a supporting point P.

The polymer actuator 220 is provided at the top of the support stick 210, and is swollen upon application of the voltage thereto.

During the image taking and the like, as shown in part (A) of FIG. 16, the support stick 210 stands aside in a way that the object light is not blocked. Moreover, no voltage is applied to the polymer actuator 220, and the polymer actuator 220 is shrunk.

When the user instructs cleaning, first, as shown in part (B) of FIG. 16, the support stick 210 is rotated with the motor, and is placed on the CCD 40.

Subsequently, when the voltage is applied to the polymer actuator 220, and when the polymer actuator 220 thus swells as shown in part (C) of FIG. 16, the support stick 210 is driven both to the right and to the left. Accordingly, the CCD 40 is cleaned.

The use of the polymer actuator 220, which swells and shrinks in response respectively to application/removal of the voltage as described above, allows compact storage thereof while cleaning is not performed. Moreover, it is made possible to efficiently perform cleaning by swelling the polymer actuator 220 at the time of cleaning.

The above descriptions have been provided for the example in which the support stick 210 is driven with the motor. However, the support stick 210 may include a dial switch for manually rotating the support stick 210, and the user may move the support stick 210 using the dial switch. Such a cleaning member does not need a motor. Thus, an increase in power consumption is prevented. Moreover, since the support stick 210 is moved in a state where the polymer actuator 220 is swollen, cleaning can be efficiently carried out with a minimal dial operation.

This completes the descriptions for the fifth embodiment of the present invention, and descriptions will now be provided for a sixth embodiment of the present invention. In the sixth embodiment of the present invention, a cleaning member including a structure substantially identical to that of the cleaning member of the fifth embodiment shown in FIG. 16 is applied. However, the cleaning method thereof is different from that of the fifth embodiment.

Figure 17:
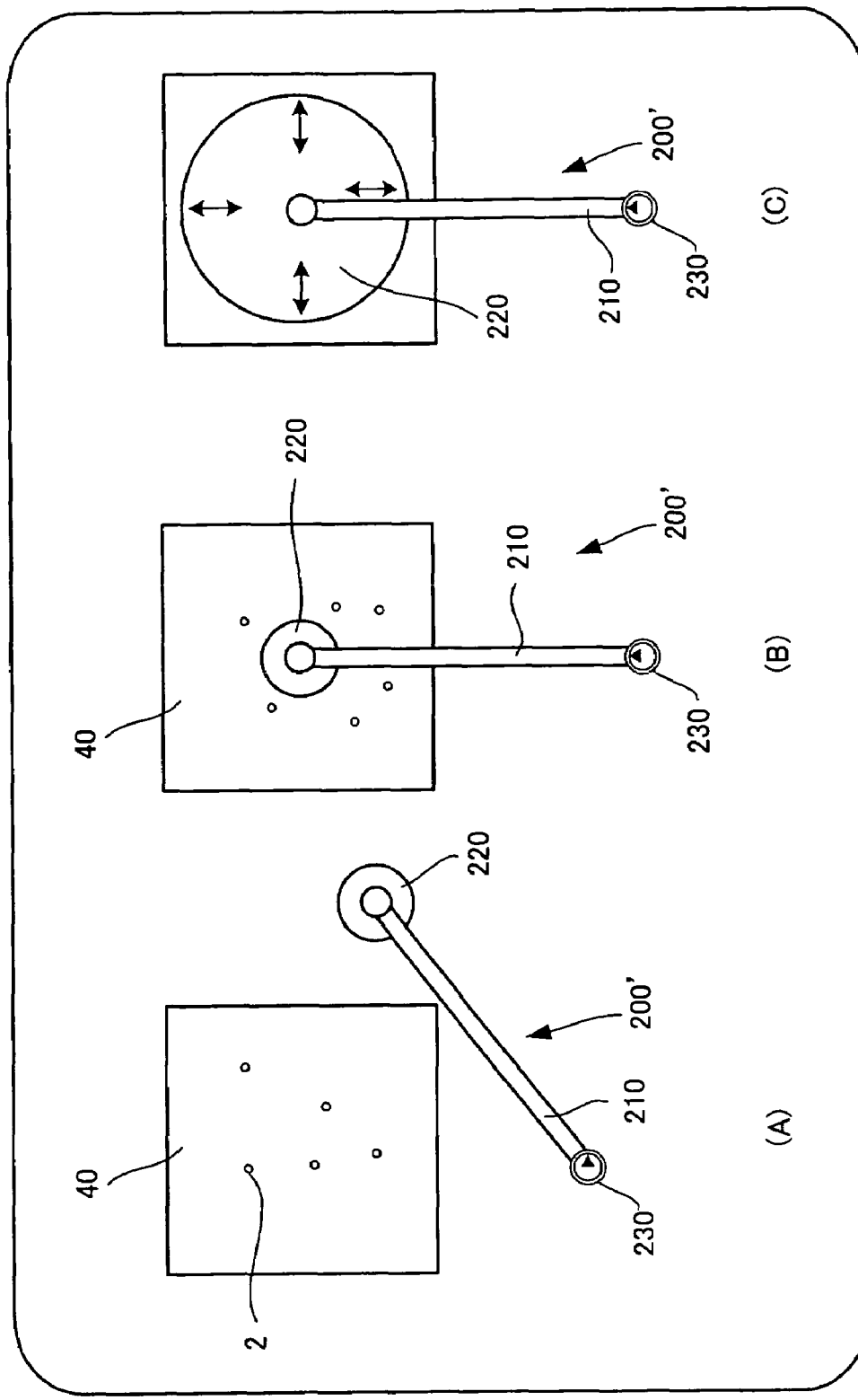
FIG. 17 is a structure and an operation of a cleaning member in a sixth embodiment of the present invention.

FIG. 17 is a view showing a structure and an operation of the cleaning member of this embodiment.

A cleaning member 200' of this embodiment has a structure substantially identical to the cleaning member 200 of the fifth embodiment shown in FIG. 16. However, the cleaning member 200' is not provided with a motor for driving the support stick 210, and is instead provided with a dial switch 230 at the supporting point P of the support stick 210. The dial switch 230 is exposed on the outer surface of the body casing of the digital camera. The user turns the dial switch 230 to rotate the support stick 210 around the supporting point P.

During the image taking or the like, as in the case of the cleaning member 200 of the fifth embodiment, the support stick 210 stands aside, and the polymer actuator 220 is shrunk (part (A) of FIG. 17).

When the user turns the dial switch 230 as shown in part (B) of FIG. 17, the support stick 210 is rotated, and is placed on the CCD 40. Moreover, information indicating that the dial switch 230 has been turned on is transmitted from the switch group 101 shown in FIG. 6 to the main CPU 110, and the voltage is repeatedly applied to, and removed from, the polymer actuator 220 for a predetermined period of time in accordance with an instruction from the optical control CPU 120. The polymer actuator 220 repeatedly swells and shrinks as shown in part (C) of FIG. 17, and the CCD 40 is thus cleaned.

The cleaning member 200' of this embodiment makes it possible to save trouble of the user manually moving the cleaning member vertically and horizontally many times. Moreover, there is no need to provide the motor for driving the support stick 210. It is therefore made possible to perform cleaning with low power consumption while preventing an increase in size of the apparatus.

Next, descriptions on various modes applicable to each of parts constituting the present invention are appended.

It is preferable that a polymer actuator be employed as the cleaning section of the present invention. Preferred examples of polymer used for the polymer actuator include ionic conducting polymer, electronic conducting polymer, and piezoelectric polymer. Moreover, an optically-driven polymer actuator can be used. These polymer actuators are described in: Nagata Yoshihito, ed. "Leading Edge of Software Actuator Development—For Realization of Artificial Muscles," NTS (2004); Yoseph Bar-Cohen, ed. "Electroactive Polymer (EAP) Actuators as Artificial Muscles—Reality, Potential and Challenges," SPIE PRESS Vol. (2001); and Yoseph Bar-Cohen et al., ed. "Electroactive Polymer (EAP) Actuators as Artificial Muscles: Reality, Potential, and Challenges, Second Edition," (2004).

1. Ionic Conducting Polymer Film (ICPF)

The ionic conducting polymer film is an actuator including an ion-exchange resin film of perfluorosulfonic acid, perfluorocarbonic acid or the like, on surfaces of which plating electrodes are respectively provided. The driving principle thereof is as follows. Ions, which are movable within the resin when an electric field is applied thereto, are attracted to one of the electrodes together with water molecules, and a side of the electrode, to which ions are moved, swells. Thus, the actuator is bent.

Japanese Patent Application Publication No. 4-275078 discloses an example of the ionic conducting polymer actuator which is easily miniaturized, which provides a high-speed response, and which operates with low power. Moreover, as a medical tube taking advantage of the fact that the ion conducting polymer actuator bends, Japanese Patent Application Publications No. 8-10336 and No. 11-198069 disclose a medical tube and a microdevice for medical purposes or for pipe check, each including an actuator at the top end thereof. In this event, the actuator includes two or more electrodes respectively formed in positions with an ion exchange resin film situated in between. Such medical tubes provide good operability in surgeries and the like since the actuator provided at the tip responds at high speed in bending thereof, and is driven with the low voltage. Furthermore, Japanese Patent Application Publication No. 2004-289994 discloses a rotatable actuator device which largely bends or moves, and which has excellent load resistance, and a composite molded product of an ion-exchange molded body suitable for the actuator device.

2. Electronic Conducting Polymer

Conducting polymer, such as polypyrrole, has a property (electrochemomechanical deformation) of swelling and shrinking by doping and dedoping accompanying redox reactions. In recent years, some conducting materials have been found to have an extremely high deformation ratio and generated force when driven with the low voltage. For example, Japanese Patent Application Publications No. 11-169393 and No. 11-169394 describe that an artificial muscle including polyaniline films respectively at two sides of a solid electrolyte organizer can be used. As for an actuator using the conducting polymer, the structure of an actuator, which includes an electrolytic solution, a counterelectrode and a polypyrrole film is reported in Synthetic Metals, Vol. 90 (1997), page 93. Furthermore, Japanese Patent Application Publication No.

2005-110494 discloses a conducting polymer composite structure bundle in which a plurality of bundled conducting polymer composite structures each including a conducting polymer layer formed on a spiral conducting substrate.

3. Piezoelectric Polymer (Piezopolymer)

It is well known that a piezoelectric device mainly composed of piezoelectric ceramic is employed as an actuator for an inkjet printer. However, polymer having piezoelectric properties, such as PVDF, is also examined as the actuator. The piezoelectric polymer is characterized by responding at a high speed, and by being applicable to dry environments. However, the piezoelectric polymer has a problem that the generated force and the deformation ratio thereof are low. For example, Japanese Patent Application Publication No. 3-343397 (Olympus) discloses a gripping tool which includes a long and thin insertion section, a polymer piezoelectric actuator formed at the tip of the insertion section, and a lead wire which transmits a drive signal to the polymer piezoelectric actuator. Accordingly, when the driving signal is supplied to the polymer piezoelectric actuator via the lead wire, the polymer piezoelectric actuator can be driven at a high response speed. Moreover, the piezoelectric polymer does not require an increase in temperature unlike a shape-memory alloy and the like. Hence, the piezoelectric polymer does not cause a burn, and safety can be secured. Furthermore, Japanese Patent Application Publication No. 8-508111 discloses an active noise and vibration absorbing formed plastics including a plurality of layers of an embedded curved PVDF (poly-vinylidene fluoride) piezoelectric material.

4. Optically-Driven Polymer Actuator

As the polymer actuator used in the present invention, an optically-driven polymer actuator, which is driven to be bent upon light irradiation, can be employed. Examples of such an optically-driven polymer actuator include a polymer actuator composed of a liquid crystal elastomer film having an azobenzen group as described in Nature, 425, 145 (2003), the liquid crystal elastomer film being bent by being exposed to ultraviolet rays. In this polymer actuator, the azobenzen group undergoes cis-trans iomerization when the film surface of the polymer actuator is irradiated with ultraviolet rays from above. As a result, a bending operation is caused. Subsequently, the polymer actuator returns to the original state by being exposed to visible light or heat.

It is supposed that, in the present invention, the liquid crystal elastomer film having an azobenzen group is used in the optically-driven polymer actuator. In this case, from the viewpoint of the durability and the response speed of the actuator, the film thickness thereof is preferably 0.1 µm to 1 mm, and more preferably 1 µm to 500 µm. The strength of the ultraviolet rays applied to induce the bending operation is preferably 1 mW/cm$^2$ to 500 mW/cm$^2$, and more preferably 10 mW/cm$^2$ to 200 mW/cm$^2$ from the viewpoint of the responsiveness. The strength of the visible light applied to restore the actuator is preferably 1 mW/cm$^2$ to 500 mW/cm$^2$, and more preferably 10 mW/cm$^2$ to 200 mW/cm$^2$ from the viewpoint of the responsiveness.

5. Cleaning Section

In a case where the polymer actuator is used in the cleaning member, an adhesive layer may be provided on the polymer actuator to increase the cleaning effect. For the adhesive layer, adhesive material including a pressure-sensitive adhesive material mainly composed of acrylic resin, silicon resin, fluorine resin, or the like.

In this event, the above descriptions have been provided for the examples of the digital camera to which the image-taking apparatus of the present invention is applied. However, the image-taking apparatus of the present invention may be applied to a mobile phone, a silver salt camera which focuses the object light on a film, and the like.

Moreover, the above descriptions have been provided for the examples of the cleaning section of the present invention to which the polymer actuators are applied. However, the cleaning section of the present invention may be, for example, an ion conductive actuator, a piezoelectric bimorph or the like as long as the cleaning section is made of a substance which is deformed in response to a stimulus.

The static electricity application section of the present invention may be a substance which generates charges by corona discharge, photoelectromotive force, UV irradiation and the like.

What is claimed is:

1. An image-taking apparatus which captures object light to take an image, the apparatus comprising:

an optical device through which the object light is transmitted;

an image pickup device which generates an image signal representing an object image obtained by focusing the object light which has passed through the optical device;

a cleaning section which is deformed by receiving a predetermined stimulus, the cleaning section being brought into contact with, and being separated from, the optical element and/or the image pickup device by the deformation to clean a substance attached to a contact portion;

a stimulus application section which applies the stimulus to the cleaning section;

a control section which controls the deformation of the cleaning section by controlling the stimulus applied to the cleaning section by the stimulus application section, and which thus causes the cleaning section to clean the contact portion; and further comprising a cleaning instruction section which gives an instruction for performing cleaning by the cleaning section according to a user operation, wherein upon receipt of the instruction for performing cleaning from the cleaning instruction section, the control section causes the stimulus application section to apply the stimulus, and thus causes the cleaning section to perform cleaning; and a body casing accommodating the image pickup device therein;

an optical lens barrel which is provided in a front part of the body casing, and which accommodates the optical device; and a lens barrel drive section which extends the optical lens barrel from the body casing, and which retracts the optical lens barrel to the body casing, wherein the control section rejects the instruction for performing cleaning from the cleaning instruction section in a case where the optical lens barrel is retracted to the body casing.

2. The image-taking apparatus according to claim 1, further comprising an image-taking instruction section which gives an instruction for taking an image in the image pickup device according to a user operation, wherein upon receipt of the instruction for taking an image from the image-taking instruction section, the control section causes the image pickup device to generate an image signal, and rejects the instruction for taking an image from the image-taking instruction section in a case where the instruction for performing cleaning is given by the instruction cleaning section.

3. The image-taking apparatus according to claim 1, wherein the control section causes the stimulus application section to apply the stimulus, thereby causing the cleaning section to perform the cleaning when the optical lens barrel is extended or retracted by the lens barrel drive section.

4. The image-taking apparatus according to claim 1, wherein the cleaning section covers a surface of the optical device and/or of the image pickup device when the cleaning section is in contact with the optical device and/or with the image pickup device, and when the image-taking apparatus is turned off, the control section causes the stimulus application section to apply a stimulus which causes the cleaning section to be in contact with the optical device and/or with the image pickup device.

5. The image-taking apparatus according to claim 1, wherein the cleaning section is composed of a polymer actuator.

6. The image-taking apparatus according to claim 1, wherein the cleaning section is composed of a polymer actuator which is deformed by ultraviolet light, and the stimulus application section emits ultraviolet light toward the cleaning section.

7. The image-taking apparatus according to claim 1, wherein the cleaning section includes an adhesive section at a side thereof which comes into contact with the optical device and/or with the image pickup device, the adhesive section adhering the substance attached to the contact portion.

8. The image-taking apparatus according to claim 1, further comprising a static electricity application section which charges and discharges the cleaning section with static electricity.

9. The image-taking apparatus according to claim 1, wherein in response to the stimulus, the cleaning section extends to come into contact with the optical device and/or with the image pickup device, or rolls up to be separated from the optical device and/or from the image pickup device, the control section causes the stimulus application section to apply the stimulus which causes the cleaning section to roll up while the image signal is generated in the image pickup device, and the apparatus further comprises a stopper member which is in contact with the cleaning section while the image signal is generated in the image pickup device, and which thus restrains the cleaning section from extending.

* * * * *